US008729324B2

(12) United States Patent
Powell et al.

(10) Patent No.: US 8,729,324 B2
(45) Date of Patent: May 20, 2014

(54) BIOMASS CONVERSION SYSTEMS HAVING INTEGRATED HEAT MANAGEMENT AND METHODS FOR USE THEREOF

(75) Inventors: Joseph Broun Powell, Houston, TX (US); Juben Nemchand Chheda, Houston, TX (US)

(73) Assignee: Shell Oil Company, Houston, TX (US)

( * ) Notice: Subject to any disclaimer, the term of this patent is extended or adjusted under 35 U.S.C. 154(b) by 61 days.

(21) Appl. No.: 13/332,301

(22) Filed: Dec. 20, 2011

(65) Prior Publication Data

US 2012/0151827 A1 Jun. 21, 2012

Related U.S. Application Data

(60) Provisional application No. 61/576,676, filed on Dec. 16, 2011, provisional application No. 61/424,803, filed on Dec. 20, 2010.

(51) Int. Cl.
*C07C 1/00* (2006.01)

(52) U.S. Cl.
USPC .......................... 585/240; 585/242; 435/166

(58) Field of Classification Search
USPC ...................... 585/240, 242; 530/302; 127/37; 435/166
See application file for complete search history.

(56) References Cited

U.S. PATENT DOCUMENTS

| 4,461,648 | A * | 7/1984 | Foody ............................... 127/37 |
| 4,752,579 | A * | 6/1988 | Arena et al. ..................... 435/99 |
| 6,090,595 | A * | 7/2000 | Foody et al. ..................... 435/99 |
| 6,663,777 | B2 * | 12/2003 | Schimel ......................... 210/603 |
| 7,189,306 | B2 * | 3/2007 | Gervais ........................... 162/21 |
| 7,649,086 | B2 * | 1/2010 | Belanger et al. .............. 530/502 |
| 7,820,418 | B2 * | 10/2010 | Karl et al. ...................... 435/161 |
| 7,985,847 | B2 * | 7/2011 | Belanger et al. .............. 530/502 |
| 8,092,680 | B2 * | 1/2012 | Johnson ........................ 210/603 |
| 8,287,651 | B2 * | 10/2012 | Benson et al. .................. 127/37 |
| 8,309,694 | B2 * | 11/2012 | Belanger et al. .............. 530/507 |
| 2010/0313882 | A1 * | 12/2010 | Dottori et al. ................... 127/37 |

FOREIGN PATENT DOCUMENTS

WO    WO 2010071805    * 6/2010

* cited by examiner

*Primary Examiner* — Nina Bhat

(57) ABSTRACT

Biomass conversion systems may incorporate integrated heat management to operate more efficiently during biomass conversion. Biomass conversion systems may comprise a first fluid circulation loop comprising a hydrothermal digestion unit, and a first catalytic reduction reactor unit in fluid communication with an inlet and an outlet of the hydrothermal digestion unit; and a second fluid circulation loop comprising a reaction product take-off line in fluid communication with the first fluid circulation loop, a second catalytic reduction reactor unit in fluid communication with the reaction product take-off line, and a recycle line establishing fluid communication between the first fluid circulation loop and an outlet of the second catalytic reduction reactor unit, where the first catalytic reduction reactor unit contains at least one first catalyst and the second catalytic reduction reactor unit contains at least one second catalyst, each being capable of activating molecular hydrogen.

26 Claims, 1 Drawing Sheet

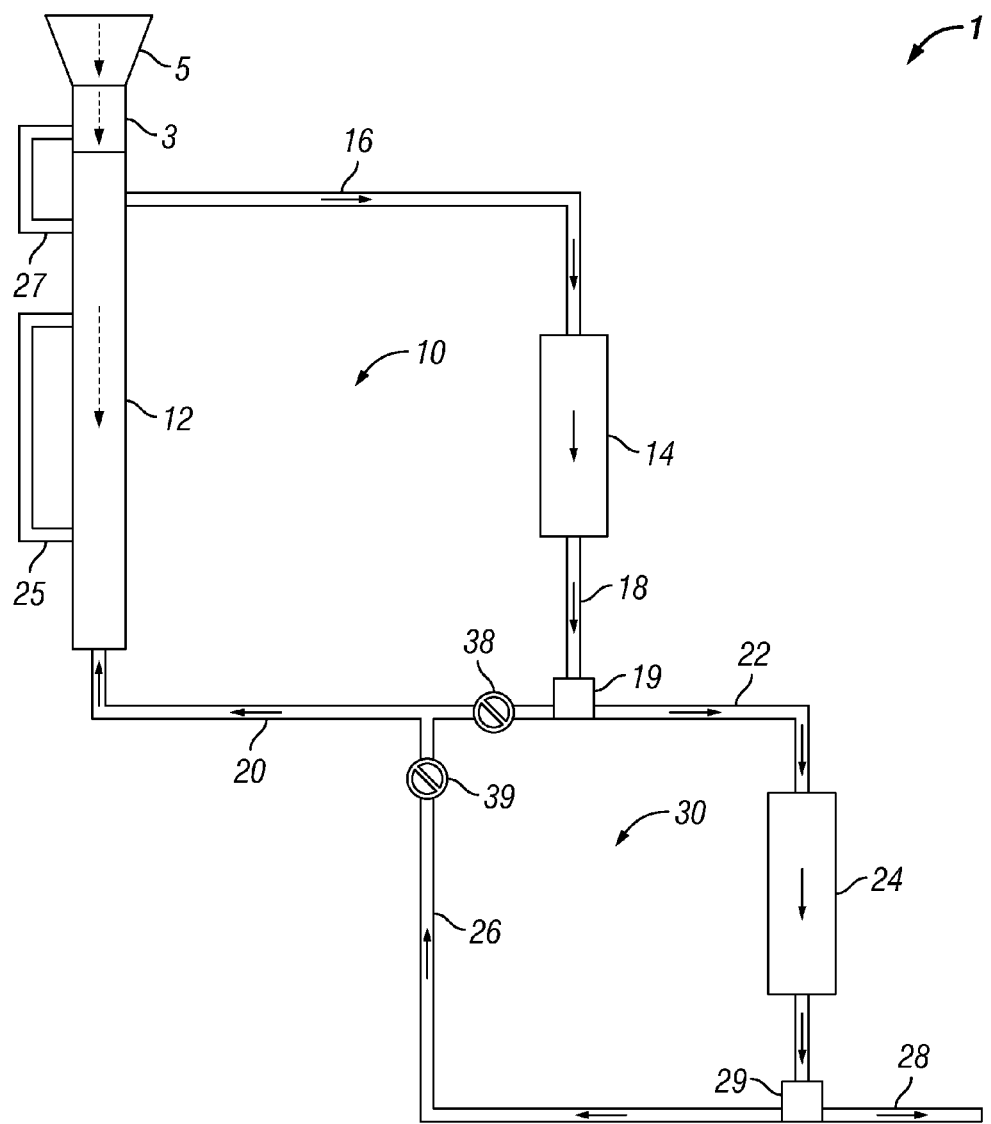

BIOMASS CONVERSION SYSTEMS HAVING INTEGRATED HEAT MANAGEMENT AND METHODS FOR USE THEREOF

The present application claims the benefit of pending U.S. Provisional Patent Application Ser. No. 61/576,676 filed Dec. 16, 2011, and pending U.S. Provisional Patent Application Ser. No. 61/424,803 filed Dec. 20, 2010, the entire disclosure of which is hereby incorporated by reference.

FIELD OF THE INVENTION

The present disclosure generally relates to the processing of cellulosic biomass into biofuels, and, more specifically, to systems and methods for processing biomass solids using integrated heat management for process control.

BACKGROUND

Significant attention has been placed on developing alternative energy sources to fossil fuels. One fossil fuel alternative having significant potential is biomass, particularly cellulosic biomass such as, for example, plant biomass. As used herein, the term "biomass" will refer to a living or recently living biological material. Complex organic molecules within biomass can be extracted and broken down into simpler organic molecules, which may subsequently be processed through known chemical transformations into industrial chemicals or fuel blends (i.e., a biofuel). In spite of biomass's potential in this regard, particularly plant biomass, an energy- and cost-efficient process that enables the conversion of biomass into such materials has yet to be realized.

Cellulosic biomass is the world's most abundant source of carbohydrates due to the lignocellulosic materials located within the cell walls of higher plants. Plant cell walls are divided into two sections: primary cell walls and secondary cell walls. The primary cell wall provides structural support for expanding cells and contains three major polysaccharides (cellulose, pectin, and hemicellulose) and one group of glycoproteins. The secondary cell wall, which is produced after the cell has finished growing, also contains polysaccharides and is strengthened through polymeric lignin covalently crosslinked to hemicellulose. Hemicellulose and pectin are typically found in abundance, but cellulose is the predominant polysaccharide and the most abundant source of carbohydrates. Collectively, these materials will be referred to herein as "cellulosic biomass."

Plants can store carbohydrates in forms such as, for example, sugars, starches, celluloses, lignocelluloses, and/or hemicelluloses. Any of these materials may represent a feedstock for conversion into industrial chemicals or fuel blends. Carbohydrates can include monosaccharides and/or polysaccharides. As used herein, the term "monosaccharide" refers to hydroxy aldehydes or hydroxy ketones that cannot be further hydrolyzed to simpler carbohydrates. Examples of monosaccharides can include, for example, dextrose, glucose, fructose, and galactose. As used herein, the term "polysaccharide" refers to saccharides comprising two or more monosaccharides linked together by a glycosidic bond. Examples of polysaccharides can include, for example, sucrose, maltose, cellobiose, and lactose. Carbohydrates are produced during photosynthesis, a process in which carbon dioxide is converted into organic compounds as a way to store energy. This energy can be released when the carbohydrates are oxidized to generate carbon dioxide and water.

Despite their promise, the development and implementation of bio-based fuel technology has been slow. A number of reasons exist for this slow development. Ideally, a biofuel would be compatible with existing engine technology and have capability of being distributed through existing transportation infrastructure. Current industrial processes for biofuel formation are limited to fermentation of sugars and starches to ethanol, which competes with these materials as a food source. In addition, ethanol has a low energy density when used as a fuel. Although some compounds that have potential to serve as fuels can be produced from biomass resources (e.g., ethanol, methanol, biodiesel, Fischer-Tropsch diesel, and gaseous fuels, such as hydrogen and methane), these fuels generally require new distribution infrastructure and/or engine technologies to accommodate their physical characteristics. As noted above, there has yet to be developed an industrially scalable process that can convert biomass into fuel blends in a cost- and energy-efficient manner that are similar to fossil fuels.

SUMMARY

The present disclosure generally relates to the processing of cellulosic biomass into biofuels, and, more specifically, to systems and methods for processing biomass solids using integrated heat management for process control.

In some embodiments, the present invention provides a biomass conversion system comprising: a first fluid circulation loop comprising: a hydrothermal digestion unit; and a first catalytic reduction reactor unit in fluid communication with an inlet and an outlet of the hydrothermal digestion unit; wherein the first catalytic reduction reactor unit contains at least one first catalyst that is capable of activating molecular hydrogen; and a second fluid circulation loop comprising: a reaction product take-off line in fluid communication with the first fluid circulation loop; second catalytic reduction reactor unit in fluid communication with the reaction product take-off line; wherein the second catalytic reduction reactor unit contains at least one second catalyst that is capable of activating molecular hydrogen; and a recycle line establishing fluid communication between the first fluid circulation loop and an outlet of the second catalytic reduction reactor unit.

In some embodiments, the present invention provides a method comprising: providing a biomass conversion system comprising: a first fluid circulation loop comprising: a hydrothermal digestion unit; and a first catalytic reduction reactor unit in fluid communication with an inlet and an outlet of the hydrothermal digestion unit; wherein the first catalytic reduction reactor unit contains at least one first catalyst that is capable of activating molecular hydrogen; and a second fluid circulation loop comprising: a reaction product take-off line in fluid communication with the first fluid circulation loop; a second catalytic reduction reactor unit in fluid communication with the reaction product take-off line; wherein the second catalytic reduction reactor unit contains at least one second catalyst that is capable of activating molecular hydrogen; and a recycle line establishing fluid communication between the first fluid circulation loop and an outlet of the second catalytic reduction reactor unit; providing a cellulosic biomass in the hydrothermal digestion unit; heating the cellulosic biomass in the hydrothermal digestion unit to digest at least a portion of the cellulosic biomass and form a hydrolysate comprising soluble carbohydrates within a liquor phase; wherein at least about 70% of the heat added to the cellulosic biomass in the hydrothermal digestion unit is generated internally in the first catalytic reduction reactor unit and the second catalytic reduction reactor unit; transferring at least a portion of the liquor phase to the first catalytic reduction reactor unit; forming a first reaction product in the first catalytic reduction reactor unit; recirculating at least a portion of the liquor phase to the hydrothermal digestion unit at a first flow rate; and altering the first flow rate to increase or decrease a temperature of the liquor phase in the first fluid circulation loop.

The features and advantages of the present invention will be readily apparent to one having ordinary skilled in the art upon a reading of the description of the preferred embodiments that follows.

BRIEF DESCRIPTION OF THE DRAWING

The following FIGURE is included to illustrate certain aspects of the present invention, and should not be viewed as an exclusive embodiment. The subject matter disclosed is capable of considerable modifications, alterations, combinations, and equivalents in form and function, as will occur to one having ordinary skill in the art and having the benefit of this disclosure.

FIG. 1 shows a schematic of an illustrative biomass conversion system of the present embodiments.

DETAILED DESCRIPTION

The present disclosure generally relates to the processing of cellulosic biomass into biofuels, and, more specifically, to systems and methods for processing biomass solids using integrated heat management for process control.

Unless otherwise specified herein, it is to be understood that use of the term "biomass" in the description that follows refers to "cellulosic biomass solids." Solids may be in any size, shape, or form. The cellulosic biomass solids may be natively present in any of these solid sizes, shapes, or forms or may be further processed prior to digestion in the embodiments described herein. The cellulosic biomass solids may be present in a slurry form in the embodiments described herein.

In practicing the present embodiments, any type of suitable biomass source may be used. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, and any combination thereof. Leaves, roots, seeds, stalks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

When converting biomass into industrial chemicals and fuel blends, the complex organic molecules therein need to be broken down into simpler molecules, which may be transformed into other compounds. For cellulosic biomass, the first step in this process is the production of soluble carbohydrates, typically by digestion. Digestion of cellulosic biomass may be conducted using an acid or base in a kraft-like process at low temperatures and pressures to produce a biomass pulp. These types of digestion processes are commonly used in the paper and pulpwood industry. According to the embodiments described herein, the digestion rate of cellulosic biomass may be accelerated in the presence of a digestion solvent at elevated temperatures and pressures that maintain the digestion solvent in a liquid state above its normal boiling point. In various embodiments, the digestion solvent may contain an organic solvent, particularly an in situ-generated organic solvent, which may provide particular advantages, as described hereinafter.

When biomass is processed into simpler molecules, a significant portion of the biomass energy content may be consumed in the conversion process. For example, energy may be expended during the separation and removal of water, and for conversion reactions and separation steps. Use of a digestion solvent at high temperatures and pressures may significantly increase the energy input requirements for the conversion process. If the energy input requirements for the digestion process become too great, the economic feasibility of cellulosic biomass as a feedstock material may be jeopardized. That is, if the energy input needed to digest and convert cellulosic biomass is too great, processing costs may become higher than the actual value of the product being generated, and the net energy produced may be low. In order to keep processing costs low and provide higher energy yields from the biomass, the amount of externally added heat input to the digestion process should be kept as low as possible while achieving as high as possible conversion of the cellulosic biomass into soluble carbohydrates.

The present disclosure provides systems and methods that allow cellulosic biomass to be efficiently digested to form soluble carbohydrates, which may subsequently be converted through one or more catalytic reduction reactions (e.g., hydrogenolysis and/or hydrogenation) into reaction products comprising oxygenated intermediates that may be further processed into higher hydrocarbons. The higher hydrocarbons may be useful in forming industrial chemicals and transportation fuels (i.e., a biofuel), including, for example, synthetic gasoline, diesel fuels, jet fuels, and the like. As used herein, the term "biofuel" will refer to any transportation fuel formed from a biological source.

As used herein, the term "soluble carbohydrates" refers to monosaccharides or polysaccharides that become solubilized in a digestion process. As used herein, the term "oxygenated intermediates" refers to alcohols, polyols, ketones, aldehydes, and mixtures thereof that are produced from a catalytic reduction reaction (e.g., hydrogenolysis and/or hydrogenation) of soluble carbohydrates. As used herein, the term "higher hydrocarbons" refers to hydrocarbons having an oxygen to carbon ratio less than that of at least one component of the biomass source from which they are produced. As used herein, the term "hydrocarbon" refers to an organic compound comprising primarily hydrogen and carbon, although heteroatoms such as oxygen, nitrogen, sulfur, and/or phosphorus may be present in some embodiments. Thus, the term "hydrocarbon" also encompasses heteroatom-substituted compounds containing carbon, hydrogen, and oxygen, for example.

Illustrative carbohydrates that may be present in cellulosic biomass include, for example, sugars, sugar alcohols, celluloses, lignocelluloses, hemicelluloses, and any combination thereof. Once soluble carbohydrates have been removed from the biomass matrix through a digestion process according to the embodiments described herein, the soluble carbohydrates may be transformed into a reaction product comprising oxygenated intermediates via a catalytic reduction reaction. Until the soluble carbohydrates are transformed by the catalytic reduction reaction, they are very reactive and may be subject to degradation under the digestion conditions. For example, soluble carbohydrates may degrade into insoluble byproducts such as, for example, caramelans and other heavy ends degradation products that are not readily transformable by further reactions into a biofuel. Such degradation products may also be harmful to equipment used in the biomass processing. According to the embodiments described herein, a liquor phase containing the soluble carbohydrates may be circulated in one or more fluid circulation loops to remove the soluble carbohydrates from the digestion conditions and convert them into less reactive oxygenated intermediates (i.e., reaction products) via catalytic reduction reactions in order to limit their degradation.

In addition to limiting the degradation of soluble carbohydrates, circulation of the liquor phase may present several additional process advantages. One of these advantages is that the amount of external heat input to the digestion process may be reduced. As previously noted, energy input requirements for the effective digestion of cellulosic biomass at high temperatures may jeopardize the economic viability of this material as a biofuel feedstock. By coupling a digestion unit and a catalytic reduction reactor unit together in a fluid circulation loop, as described in the present embodiments, much more efficient heat integration may be realized. Catalytic reduction reactions such as, for example, hydrogenation reactions and/or hydrogenolysis reactions, are exothermic processes that may supply their excess generated heat to the endothermic digestion process when these processes are coupled together in a fluid circulation loop. Thus, the need for external heat input to drive the digestion process may be considerably lessened. Furthermore, this represents an efficient use of the excess heat generated by the catalytic reduction reaction, which would otherwise need to be dissipated in some manner. According to some embodiments herein, at least about 50% of the heat added to the digestion unit may come from the catalytic reduction reaction. In some embodiments, at least about 60% of the heat added to the digestion unit may come from the catalytic reduction reaction. In some embodiments, at least about 70% of the heat added to the digestion unit may come from the catalytic reduction reaction. In some embodiments, at least about 80% of the heat added to the digestion unit may come from the catalytic reduction reaction. Further discussion of heat integration in the foregoing manner is discussed in greater detail hereinbelow.

A leading advantage of the biomass conversion systems described herein is that the systems are designed to favor a high conversion of biomass into a hydrolysate comprising soluble carbohydrates, for subsequent processing into a biofuel. The biomass conversion systems and associated methods described herein are to be distinguished from those of the paper and pulpwood industry, where the goal is to harvest partially digested wood pulp, rather than obtaining high quantities of soluble carbohydrates by digesting as much of the cellulosic biomass as possible. In some embodiments, at least about 60% of the cellulosic biomass, on a dry basis, may be digested to form a hydrolysate comprising soluble carbohydrates. In other embodiments, at least about 90% of the cellulosic biomass, on a dry basis, may be digested to form a hydrolysate comprising soluble carbohydrates. The design and operation of the present systems may enable such high conversion rates by minimizing the formation of degradation products during the processing of biomass. As previously noted the present systems and methods may achieve the foregoing in an energy- and cost-efficient manner.

A further advantage of the embodiments described herein is that they may address the issue of lignin precipitation in the reactor system, while simultaneously addressing the foregoing issues of heat integration and soluble carbohydrate degradation. Lignin is a hydrophobic biopolymer comprising about 30% of the dry weight of cellulosic biomass. Lignin cannot be directly converted into desired biofuel components via digestion, since it does not comprise a carbohydrate backbone. Since lignin is hydrophobic, it may precipitate if its concentration becomes too high in an aqueous digestion solvent. Although the processes described herein are favorable in that they may result in a high conversion of cellulosic biomass into soluble materials suitable for conversion into liquid biofuels, they may also result in high lignin concentrations in the digestion solvent, which may result in precipitation. Precipitation or deposition of lignin in the reactor system may result in costly process downtime. Although the solubility of lignin may be increased by adding an external organic solvent to an aqueous digestion solvent, this approach may be inefficient in terms of the above-noted process energy and heat input issues. This problem, among others, has been solved in the present disclosure through forming an in situ-generated organic solvent (i.e., a reaction product produced by a catalytic reduction reaction) and recirculating the solvent within the fluid circulation loop containing the digestion unit in order to address the foregoing issue of lignin precipitation while not compromising the heat integration of the process. A further description of the solution to the foregoing process is provided in more detail hereinbelow.

According to the embodiments described herein, at least a portion of a reaction product (i.e., oxygenated intermediates) produced from a catalytic reduction reactor unit within a fluid circulation loop may be recirculated to a digestion unit contained within the fluid circulation loop. As described above, this approach may minimize soluble carbohydrate degradation and improve heat integration. The remainder of the reaction product may be withdrawn from the fluid circulation loop and be subsequently transformed. Specifically, at least a portion of the reaction product may be transferred to another catalytic reduction reactor unit within another fluid circulation loop in order to further transform the reaction product. For example, the subsequent catalytic reduction reaction unit may transform any soluble carbohydrates not previously converted into oxygenated intermediates and/or remove additional oxygenated functionalities from the reaction product previously produced. Optional separations of an organic phase from an aqueous phase may take place after each catalytic reduction reaction, which may increase the organic solvent content of the reaction products.

According to the embodiments described herein, the foregoing fluid circulation loops may be in fluid communication with one another. This arrangement may allow at least a portion of the reaction product produced in the second fluid circulation loop to be recirculated to the first fluid circulation loop. Since the reaction product of the second fluid circulation loop may be more highly enriched in organic solvents, recirculating a portion of this reaction product to the first fluid circulation loop may enhance lignin solubility without compromising heat integration. In contrast, if an external organic solvent were added to the first fluid circulation loop, it would need to be heated to maintain the digestion rate, which would increase the energy costs of the process. The remainder of the reaction product may be withdrawn from the second fluid circulation loop and subsequently transformed to a biofuel. Transformation into a biofuel may involve any combination of further hydrogenolysis reactions, hydrogenation reactions, condensation reactions, isomerization reactions, oligomerization reactions, hydrotreating reactions, alkylation reactions, and the like.

In some embodiments, biomass conversion systems described herein can comprise a first fluid circulation loop comprising: a hydrothermal digestion unit; and a first catalytic reduction reactor unit in fluid communication with an inlet and an outlet of the hydrothermal digestion unit; wherein the first catalytic reduction reactor unit contains at least one first catalyst that is capable of activating molecular hydrogen; and a second fluid circulation loop comprising: a reaction product take-off line in fluid communication with the first fluid circulation loop; a second catalytic reduction reactor unit in fluid communication with the reaction product take-off line; wherein the second catalytic reduction reactor unit contains at least one second catalyst that is capable of activating molecular hydrogen; and a recycle line establishing fluid communication between the first fluid circulation loop and an outlet of the second catalytic reduction reactor unit.

In some embodiments, the hydrothermal digestion unit may be, for example, a pressure vessel of carbon steel, stainless steel, or a similar alloy. In some embodiments, a single digestion unit may be used. In other embodiments, multiple digestion units operating in series, parallel or any combination thereof may be used. In some embodiments, digestion may be conducted in a pressurized digestion unit operating continuously. However, in other embodiments, digestion may be conducted in batch mode. Suitable digestion units may include, for example, the "PANDIA™ Digester" (Voest-Alpine Industrienlagenbau GmbH, Linz, Austria), the "DEFIBRATOR Digester" (Sunds Defibrator AB Corporation, Stockholm, Sweden), the M&D (Messing & Durkee) digester (Bauer Brothers Company, Springfield, Ohio, USA) and the KAMYR Digester (Andritz Inc., Glens Falls, N.Y., USA). In some embodiments, the biomass may be at least partially immersed in the digestion unit. In other embodiments, the digestion unit may be operated as a trickle bed or pile-type digestion unit. Fluidized bed and stirred contact digestion units may also be used in some embodiments. Suitable digestion unit designs may include, for example, co-current, countercurrent, stirred tank, or fluidized bed digestion units.

In general, digestion may be conducted in a liquor phase. In some embodiments, the liquor phase may comprise a digestion solvent that comprises water. In some embodiments, the liquor phase may further comprise an organic solvent. In some embodiments, the organic solvent may comprise oxygenated intermediates produced from a catalytic reduction reaction of soluble carbohydrates (i.e., a reaction product). For example, in some embodiments, a digestion solvent may comprise oxygenated intermediates produced by a hydrogenolysis reaction of soluble carbohydrates. Such a hydrogenolysis reaction may take place in either or both of the catalytic reduction reactor units described hereinabove. Other organic solvents may be produced by conducting hydrogenation and/or combined hydrogenolysis/hydrogenation in the catalytic reduction reactor units. In some embodiments, bio-ethanol may be added to water as a startup digestion solvent, with a solvent comprising oxygenated intermediates being produced thereafter. Any other organic solvent that is miscible with water may also be used as a startup digestion solvent, if desired. In general, a sufficient amount of liquor phase is present in the digestion process such that the biomass surface remains wetted. The amount of liquor phase may be further chosen to maintain a sufficiently high concentration of soluble carbohydrates to attain a desirably high reaction rate during subsequent catalytic reduction, but not so high that degradation becomes problematic. In some embodiments, the concentration of soluble carbohydrates may be kept below about 5% by weight of the liquor phase to minimize degradation. However, it is to be recognized that higher concentrations may be used in some embodiments. In some embodiments, organic acids such as, for example, acetic acid, oxalic acid, acetylsalicylic acid, and acetylsalicylic acid may be included in the liquor phase as an acid promoter of the digestion process.

In some embodiments, prior to digestion, the cellulosic biomass may be washed and/or reduced in size (e.g., by chopping, crushing, debarking, and the like) to achieve a desired size and quality for being digested. These operations may remove substances that interfere with further chemical transformations of soluble carbohydrates and/or improve penetration of the digestion solvent into the biomass. In some embodiments, washing may occur within the digestion unit prior to pressurization. In other embodiments, washing may occur before the biomass is placed in the digestion unit.

In some embodiments, the digestion solvent may comprise oxygenated intermediates of an in situ-generated organic solvent. As used herein, the term "in situ generated organic solvent" refers to the reaction product produced from a catalytic reduction reaction of soluble carbohydrates, where the catalytic reduction reaction takes place in a catalytic reduction reactor unit coupled to the biomass conversion system. In some embodiments, the in situ-generated organic solvent may comprise at least one alcohol, ketone, or polyol. In alternative embodiments, the digestion solvent may be at least partially supplied from an external source. For example, in an embodiment, bio-ethanol may be used to supplement the in situ-generated organic solvent. In some embodiments, the digestion solvent may be separated, stored, or selectively injected into the digestion unit so as to maintain a desired concentration of soluble carbohydrates.

In some embodiments, digestion may take place over a period of time at elevated temperatures and pressures. In some embodiments, digestion may take place at a temperature ranging between about 100° C. to about 240° C. for a period of time. In some embodiments, the period of time may range between about 0.25 hours and about 24 hours. In some embodiments, the digestion to produce soluble carbohydrates may occur at a pressure ranging between about 1 bar (absolute) and about 100 bar.

In various embodiments, suitable biomass digestion techniques may include, for example, acid digestion, alkaline digestion, enzymatic digestion, and digestion using hot-compressed water.

Various factors may influence the digestion process. In some embodiments, hemicellulose may be extracted from the biomass at temperatures below about 160° C. to produce a predominantly $C_5$ carbohydrate fraction. At increasing temperatures, this $C_5$ carbohydrate fraction may be thermally degraded. It may therefore be advantageous to convert the $C_5$ and/or $C_6$ carbohydrates and/or other sugar intermediates into more stable intermediates such as sugar alcohols, alcohols, and polyols. By reacting the soluble carbohydrates in a catalytic reduction reactor unit and recirculating at least a portion of the reaction product to the digestion unit, the concentration of oxygenated intermediates may be increased to commercially viable concentrations while the concentration of soluble carbohydrates is kept low.

In some embodiments, cellulose digestion may begin above about 160° C., with solubilization becoming complete at temperatures around about 190° C., aided by organic acids (e.g., carboxylic acids) formed from partial degradation of carbohydrate components. Some lignins may be solubilized before cellulose, while other lignins may persist to higher temperatures. These lignins may optionally be removed at a later time. The digestion temperature may be chosen so that carbohydrates are solubilized while limiting the formation of degradation products.

In some embodiments, a plurality of digestion units may be used. In such embodiments, the biomass may first be introduced into a digestion unit operating at about 160° C. or below to solubilize $C_5$ carbohydrates and some lignin without substantially degrading these products. The remaining biomass may then exit the first digestion unit and pass to a second digestion unit. The second digestion unit may be used to solubilize $C_6$ carbohydrates at a higher temperature. In another embodiment, a series of digestion units may be used with an increasing temperature profile, such that a desired carbohydrate fraction is solubilized in each.

As previously described, one particularly advantageous feature of the biomass conversion systems described herein is the heat integration and management offered by re-circulating at least a portion of the reaction product produced in the first catalytic reduction reactor unit to the hydrothermal digestion unit. It should be noted, however, that when utilizing this approach, purification of the hydrolysate is not typically performed before the hydrolysate enters the first catalytic reduction reactor unit, since conventional purification techniques such as ion exchange and chromatographic separation techniques (e.g., size exclusion, membrane separation, and the like) are often incompatible with the high temperatures of the hydrolysate exiting the digestion unit. If the hydrolysate were cooled (e.g., to less than 100° C.) to conduct purification (e.g., by ion exchange or chromatographic separation) and then reheated to the original temperature, the heat integration benefits of the present embodiments could be at least partially reduced. For an integrated process operating with a high recirculation rate of solvent to minimize degradation of hydrolysate, the additional process energy needed for reheating following purification may represent a substantial portion of the heating value of the produced biofuels. This may result in low energy yields for the process. However, if purification of the hydrolysate is not performed, poisoning of the catalyst in at least the first catalytic reduction reactor unit may occur. Illustrative impurities that may poison catalysts used for catalytic reduction reactions may include, for example, nitrogen compound impurities, sulfur compound impurities, and any combination thereof. Such impurities may be organic or inorganic in nature and may be natively present in the cellulosic biomass or formed during the digestion process used to produce soluble carbohydrates from cellulosic material, for example.

In view of the advantages offered by heat integration, as described herein, in some embodiments, the first fluid circulation loop may lack a purification mechanism operable for removing nitrogen compound impurities, sulfur compound impurities, or any combination thereof. That is, in such embodiments, during the operation of the present biomass conversion systems, a hydrolysate produced from the hydrothermal digestion unit may not be purified prior to being transferred to the first catalytic reduction reactor unit. To avoid catalyst poisoning in such embodiments, a poison-tolerant catalyst may be used in at least the first catalytic reduction reactor unit. As used herein, a "poison-tolerant catalyst" is defined as a catalyst that is capable of activating molecular hydrogen without needing to be regenerated or replaced due to low catalytic activity for at least about 12 hours of continuous operation. In some or other embodiments, a poison-tolerant catalyst may also be used in the second catalytic reduction reactor unit. In some embodiments, a poison-tolerant catalyst may be used in the first catalytic reduction reactor unit and a conventional catalyst capable of activating molecular hydrogen may be used in the second catalytic reduction reactor unit. In some embodiments, a poison-tolerant catalyst may be used in both the first catalytic reduction reactor unit and the second catalytic reduction reactor unit. In some cases, a poison-tolerant catalyst may produce a lower catalytic turnover rate than does a conventional catalyst. Therefore, in embodiments in which a poison-tolerant catalyst is used in the first catalytic reduction reactor unit, it may be advantageous to use a higher activity conventional catalyst in the second catalytic reduction reactor unit to complete the reduction of soluble carbohydrates into a reaction product. It is believed that any poisons present in the hydrolysate will primarily interact with the catalyst in the first catalytic reduction reactor unit, thereby allowing a conventional catalyst to be used in the second catalytic reduction reactor unit with less risk of poisoning. In alternative embodiments, a regenerable catalyst may be used in either catalytic reduction reactor unit. As used herein, a "regenerable catalyst" may have at least some of its catalytic activity restored through regeneration, even when poisoned with nitrogen compound impurities, sulfur compound impurities, or any combination thereof. Ideally, such regenerable catalysts should be regenerable with a minimal amount of process downtime.

In some embodiments, suitable poison-tolerant catalysts may include, for example, a sulfided catalyst. Sulfided catalysts suitable for activating molecular hydrogen are described in commonly owned U.S. Patent Applications 61/496, 653, filed Jun. 14, 2011, and 61/553,591, filed Oct. 31, 2011, each of which is incorporated herein by reference in its entirety. Sulfiding may take place by treating a catalyst with hydrogen sulfide, optionally while the catalyst is deposited on a solid support. In more particular embodiments, the poison-tolerant catalyst may be a sulfided cobalt-molybdate catalyst. We have found that sulfided cobalt-molybdate catalysts may give a high yield of the desired mono-oxygenate intermediates including $C_2$-$C_6$ alcohols and ketones, while not forming an excess amount of $C_2$-$C_4$ alkanes. The mono-oxygenated intermediates formed may be readily separated from water via flash vaporization or liquid-liquid phase separation, and undergo condensation-oligomerization reactions in separate steps over an acid or base catalyst, to product liquid biofuels in the gasoline, jet, or diesel range.

In general, the catalytic reduction reactor units used in accordance with the embodiments described herein may be of any suitable type or configuration. In some embodiments, at least one of the catalytic reduction reactor units may comprise a fixed bed catalytic reactor such as, for example, a trickle bed catalytic reactor. For example, in some embodiments, the first catalytic reduction reactor unit may comprise a fixed bed catalytic reactor. Other suitable catalytic reactors may include, for example, slurry bed catalytic reactors with filtration, loop reactors, upflow gas-liquid reactors, ebullating bed reactors, fluidized bed reactors, and the like.

In some embodiments, the catalytic reduction reactions carried out in the catalytic reduction reactor units may be hydrogenolysis reactions. A further description of hydrogenolysis reactions follows.

Various processes are known for performing hydrogenolysis of carbohydrates. One suitable method includes contacting a carbohydrate or stable hydroxyl intermediate with hydrogen, optionally mixed with a diluent gas, and a hydrogenolysis catalyst under conditions effective to form a reaction product comprising oxygenated intermediates such as, for example, smaller molecules or polyols. As used herein, the term "smaller molecules or polyols" includes any molecule having a lower molecular weight, which may include a smaller number of carbon atoms and/or oxygen atoms, than the starting carbohydrate. In an embodiment, reaction products of a hydrogenolysis reaction may include smaller molecules such as, for example, polyols and alcohols. This aspect of hydrogenolysis entails the breaking of carbon-carbon bonds In an embodiment, a soluble carbohydrate may be converted to relatively stable oxygenated intermediates such as, for example, propylene glycol, ethylene glycol, and/or glycerol using a hydrogenolysis reaction in the presence of a catalyst that is capable of activating molecular hydrogen. Suitable catalysts may include, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. Other suitable catalysts may include the poison-tolerant catalysts set forth above. In some embodiments, the catalysts and promoters may allow for hydrogenation and hydrogenolysis reactions to occur at the same time or in succession. The catalyst may also include a carbonaceous pyropolymer catalyst containing transition metals (e.g., chromium, molybdenum, tungsten, rhenium, manganese, copper, and cadmium) or Group VIII metals (e.g., iron, cobalt, nickel, platinum, palladium, rhodium, ruthenium, iridium, and osmium). In certain embodiments, the catalyst may include any of the above metals combined with an alkaline earth metal oxide or adhered to a catalytically active support. In certain embodiments, the catalyst used in the hydrogenolysis reaction may include a catalyst support.

The conditions under which to carry out the hydrogenolysis reaction may vary based on the type of biomass starting material and the desired products (e.g., gasoline or diesel), for example. One of ordinary skill in the art, with the benefit of this disclosure, will recognize the appropriate conditions to use to carry out the reaction. In general, the hydrogenolysis reaction may be conducted at temperatures in the range of about 110° C. to about 300° C., preferably from about 170° C. to about 300° C., and most preferably from about 180° C. to about 290° C.

In an embodiment, the hydrogenolysis reaction may be conducted under basic conditions, preferably at a pH of about 8 to about 13, and even more preferably at a pH of about 10 to about 12. In an embodiment, the hydrogenolysis reaction may be conducted at a pressure ranging between about 1 bar (absolute) and about 150 bar, preferably at a pressure ranging between about 15 bar and about 140 bar, and even more preferably at a pressure ranging between about 50 bar and about 110 bar.

The hydrogen used in the hydrogenolysis reaction may include external hydrogen, recycled hydrogen, in situ generated hydrogen, or any combination thereof.

In some embodiments, the reaction products of the hydrogenolysis reaction may comprise greater than about 25% by mole, or, alternatively, greater than about 30% by mole of polyols, which may result in a greater conversion to a biofuel in subsequent processing.

In some embodiments, hydrogenolysis may be conducted under neutral or acidic conditions, as needed to accelerate hydrolysis reactions in addition to the hydrogenolysis reaction. For example, hydrolysis of oligomeric carbohydrates may be combined with hydrogenation to produce sugar alcohols, which may undergo hydrogenolysis.

A second aspect of hydrogenolysis entails the breaking of —OH bonds such as: $RC(H)_2—OH+H_2 \rightarrow RCH_3+H_2O$. This reaction is also called "hydrodeoxygenation," and may occur in parallel with C—C bond breaking hydrogenolysis. Diols may be converted to mono-oxygenates via this reaction. As reaction severity is increased with increasing temperature or contact time with the catalyst, the concentration of polyols and diols relative to mono-oxygenates may diminish as a result of hydrodeoxygenation. Selectivity for C—C vs. C—OH bond hydrogenolysis may vary with catalyst type and formulation. Full de-oxygenation to alkanes may also occur, but is generally undesirable if the intent is to produce mono-oxygenates or diols and polyols which may be condensed or oligomerized to higher molecular weight compounds in during subsequent processing. Typically, it is desirable to send only mono-oxygenates or diols to subsequent processing steps, as higher polyols may lead to excessive coke formation during condensation or oligomerization. Alkanes, in contrast, are essentially unreactive and cannot be readily combined to produce higher molecular weight compounds.

Once oxygenated intermediates have been formed by a hydrogenolysis reaction, a portion of the reaction product may be recirculated to the digestion unit to serve as an internally generated digestion solvent. Another portion of the reaction product may be withdrawn and subsequently processed by further reforming reactions to form a biofuel or subjected to further catalytic reduction reactions in another fluid circulation loop. Before being withdrawn from the first fluid circulation loop, the reaction product may optionally be separated into different components (e.g., an aqueous phase and an organic phase). Suitable separation mechanisms may include, for example, phase separation, solvent stripping columns, extractors, filters, distillations and the like. In an embodiment, azeotropic distillation may be used to affect separation. In some embodiments, a separation of lignin from the reaction product may be conducted before the reaction product is subsequently processed further or recirculated to the digestion unit.

The embodiments described herein will now be further described with reference to the drawing. FIG. 1 shows a schematic of an illustrative biomass conversion system 1 corresponding to at least one of the present embodiments. As depicted in FIG. 1, biomass conversion system 1 contains first fluid circulation loop 10 and second fluid circulation loop 30. First fluid circulation loop 10 contains hydrothermal digestion unit 12 and first catalytic reduction reactor unit 14 that are in fluid communication with one another. Second fluid circulation loop 30 is in fluid communication with first fluid circulation loop 10 and contains reaction product take-off line 22, second catalytic reduction reactor unit 24, and recycle line 26. Fluid communication of second fluid circulation loop 30 with first fluid circulation loop 10 is established via reaction product take-off line 22 and recycle line 26.

In some embodiments, the biomass conversion systems may further comprise a biomass feed mechanism that is operatively coupled to the hydrothermal digestion unit and allows a cellulosic biomass to be continuously or semi-continuously added to the hydrothermal digestion unit without the hydrothermal digestion unit being fully depressurized. In some embodiments, the biomass feed mechanism may comprise a pressurization zone. Cellulosic biomass may be pressurized using pressurization zone 3 and then introduced to hydrothermal digestion unit 12 in a continuous or semi-continuous manner without fully depressurizing the digestion unit. Pressurizing the cellulosic biomass prior to its introduction to hydrothermal digestion unit 12 may allow the digestion unit to remain pressurized and operating continuously during biomass addition. Additional benefits of pressurizing the biomass prior to digestion are also discussed hereinafter. As used herein, the term "continuous addition" and grammatical equivalents thereof will refer to a process in which biomass is added to a digestion unit in an uninterrupted manner without fully depressurizing the digestion unit. As used herein, the term "semi-continuous addition" and grammatical equivalents thereof will refer to a discontinuous, but as-needed, addition of biomass to a digestion unit without fully depressurizing the digestion unit.

During the operation of system 1, pressurization zone 3 may cycle between a pressurized state and an at least partially depressurized state, while hydrothermal digestion unit 12 remains continuously operating in a pressurized state. While pressurization zone 3 is at least partially depressurized, cellulosic biomass may be introduced to pressurization zone 3 via loading mechanism 5. Suitable loading mechanisms may include, for example, conveyer belts, vibrational tube conveyers, screw feeders, bin dispensers, and the like. It is to be recognized that, in some embodiments, loading mechanism 5 may be omitted. For example, in some embodiments, addition of cellulosic biomass to pressurization zone 3 may take place manually. Suitable types of pressurization zones and operation thereof are described in commonly owned U.S. Patent Applications Ser. Nos. 61/576,664 and 61/576,691, each filed concurrently herewith and incorporated herein by reference in its entirety.

In some embodiments, the cellulosic biomass within pressurization zone 3 may be pressurized, at least in part, by introducing at least a portion of the liquor phase in hydrothermal digestion unit 12 to pressurization zone 3. In some or other embodiments, the cellulosic biomass within pressurization zone 3 may be pressurized, at least in part, by introducing a gas to pressurization zone 3. In some embodiments, the liquor phase may comprise an organic solvent, which is generated as a reaction product of first catalytic reduction reactor 14 and/or second catalytic reduction reactor 24. In some embodiments, the liquor phase may be transferred from hydrothermal digestion unit 12 to pressurization zone 3 by optional line 27. In some embodiments, system 1 may further include optional line 25, which may transfer liquor phase internally within hydrothermal digestion unit 12. Reasons why one would want to include line 25 may include, for example, to maintain linear velocity of the liquor phase in the digestion unit and to further manage the temperature profile. In some or other embodiments, the liquor phase may be transferred from a surge vessel (not shown) within first fluid circulation loop 10.

At least two benefits may be realized by pressurizing the biomass in the presence of the liquor phase. First, pressurizing the biomass in the presence of the liquor phase may cause the digestion solvent to infiltrate the biomass, which causes the biomass to sink in the digestion solvent once introduced to the digestion solvent. Further, by adding hot liquor phase to the biomass in pressurization zone 3, less energy needs to be input to bring the biomass up to temperature once introduced to hydrothermal digestion unit 12.

After introducing cellulosic biomass to hydrothermal digestion unit 12, the biomass may be heated under pressure in the presence of a digestion solvent to produce a hydrolysate comprising soluble carbohydrates. As the biomass is digested, the liquor phase containing the hydrolysate is transported by line 16 to first catalytic reduction reactor unit 14, where the soluble carbohydrates may be reduced to form oxygenated intermediates (e.g., a first reaction product). For example, in some embodiments, the soluble carbohydrates may be reduced via a hydrogenolysis reaction. After oxygenated intermediates have been produced, they may exit first catalytic reduction reactor 14 via line 18. At this point, the liquor phase may either be recirculated to hydrothermal digestion unit 12 via line 20 or transferred to second fluid circulation loop 30 for further processing.

In some embodiments, the present biomass conversion systems may further comprise phase separation mechanism 19 in fluid communication with an outlet of first catalytic reduction reactor unit 14. In some embodiments, the present biomass conversion systems may further comprise phase separation mechanism 29 in fluid communication with an outlet of second catalytic reduction reactor unit 24. In some embodiments, a phase separation mechanism may be in fluid communication with both catalytic reduction reactor units. Suitable phase separation mechanisms may include for, example, phase separation, solvent stripping columns, extractors, filters, distillations and the like. In an embodiment, azeotropic distillation may be conducted.

When using a phase separation mechanism, the reaction product produced from first catalytic reduction reactor unit 14 may be at least partially separated into an aqueous phase and an organic phase prior to being recirculated to hydrothermal digestion unit 12 or transferred to second fluid circulation loop 30. In some embodiments, the aqueous phase obtained from separation may be recirculated to hydrothermal digestion unit 12, and the organic phase obtained from separation may be transferred to second fluid circulation loop 30 for further processing. In other embodiments, the organic phase or a mixed aqueous/organic phase may be returned to hydrothermal digestion unit 12. Performing a separation of the reaction product from first catalytic reduction reactor unit 14 is one manner in which the fluid circulating in second fluid circulation loop 30 may become more enriched in organic compounds. For example, in some embodiments, the reaction product of second catalytic reduction reactor unit 24 may contain a higher percentage of organic compounds than it does water.

The liquor phase transferred to second fluid circulation loop 30 via reaction product take-off line 22 may comprise oxygenated intermediates produced from first catalytic reduction reactor unit 14 and any soluble carbohydrates that were not transformed. The liquor phase may travel to second catalytic reduction reactor unit 24, where a second catalytic reduction reaction may occur. For example, further hydrogenolysis and/or hydrogenation may be conducted in second catalytic reduction reactor unit 24. The catalytic reduction reaction that takes place in second catalytic reduction reactor unit 24 may produce a second reaction product that has less oxygenation and/or lower residual untransformed carbohydrates than the first reaction product, for example.

Once the second reaction product exits second catalytic reduction reactor unit 24, it may either be recirculated to first fluid circulation loop 10 via recycle line 26 or removed from second fluid circulation loop 30 via reaction product take-off line 28. In some embodiments, at least a portion of the second reaction product may be recirculated to first fluid circulation loop 10. In some or other embodiments, at least a portion of the second reaction product may be withdrawn from second fluid circulation loop 30 and subsequently be transformed into a biofuel. A description of the processes that may be used to form a biofuel are described in further detail below.

In some embodiments, an optional separation of the second reaction product may be performed using phase separation mechanism 29. Suitable phase separation mechanisms may include those set forth above. In some embodiments, the second reaction product may be at least partially separated into an aqueous phase and an organic phase. In some embodiments, the organic phase may be split, with at least a portion of the organic phase being recirculated to first fluid circulation loop 10 and at least a portion of the organic phase being withdrawn via reaction product take-off line 28. In some embodiments, the separated aqueous phase may be discarded.

In other embodiments, the separated aqueous phase may be returned to first fluid circulation loop 10. As noted above, recirculating an organic-rich phase to first fluid circulation loop 10 may be advantageous for inhibiting the precipitation of lignin.

In the embodiment depicted in FIG. 1, line 20 and hydrothermal digestion unit 12 are configured such that countercurrent flow is established within the digestion unit. As used herein, the term "countercurrent flow" refers to the direction a reaction product enters the hydrothermal digestion unit relative to the direction in which biomass is introduced to the digestion unit. Although it may be advantageous to establish countercurrent flow within hydrothermal digestion unit 12, there is no requirement to do so. For example, co-current flow may be established by connecting line 20 nearer the top of hydrothermal digestion unit 12. However, establishing countercurrent flow in hydrothermal digestion unit 12 may be beneficial in terms of establishing a temperature gradient therein. This temperature gradient may be beneficial for promoting the solubilization of carbohydrates, as described hereinabove. Countercurrent flow may also be beneficial for heat integration purposes, as the liquor phase will have a longer flow pathway in hydrothermal digestion unit 12 over which to deposit its excess heat than in other flow configurations.

In some embodiments, there may be a flow control mechanism associated with each fluid circulation loop that allows a recycle ratio in each fluid circulation loop to be altered. Still referring to FIG. 1, first fluid circulation loop 10 and second fluid circulation loop 30 may contain flow controllers 38 and 39, respectively. Flow controllers 38 and 39 may allow flow rates within each fluid circulation loop to be regulated. Suitable flow controllers may include, for example, adjustable flow restrictors, adjustable valves (e.g., gate, needle, diaphragm valves), flow control valves, timed valves, timed flow splitter valves, reflux splitters, and the like. By regulating the amount of liquor phase being recirculated to hydrothermal digestion unit 12, the temperature therein may be controlled, while still allowing sufficient reaction product quantities to be withdrawn for subsequent processing into a biofuel. Suitable flow rates and recycle ratios are considered in more detail hereinbelow.

In some embodiments, the present biomass conversion systems may be used for processing of cellulosic biomass into soluble carbohydrates and oxygenated intermediates, which may be subsequently transformed into a biofuel, for example. In some embodiments, the methods can comprise: providing a biomass conversion system comprising: a first fluid circulation loop comprising: a hydrothermal digestion unit; and a first catalytic reduction reactor unit in fluid communication with an inlet and an outlet of the hydrothermal digestion unit; wherein the first catalytic reduction reactor unit contains at least one first catalyst that is capable of activating molecular hydrogen; and a second fluid circulation loop comprising: a reaction product take-off line in fluid communication with the first fluid circulation loop; a second catalytic reduction reactor unit in fluid communication with the reaction product take-off line; wherein the second catalytic reduction reactor unit contains at least one second catalyst that is capable of activating molecular hydrogen; and a recycle line establishing fluid communication between the first fluid circulation loop and an outlet of the second catalytic reduction reactor unit; providing a cellulosic biomass in the hydrothermal digestion unit; heating the cellulosic biomass in the hydrothermal digestion unit to digest at least a portion of the cellulosic biomass and form a hydrolysate comprising soluble carbohydrates within a liquor phase; wherein at least about 70% of the heat added to the cellulosic biomass in the hydrothermal digestion unit is generated internally in the first catalytic reduction reactor unit and the second catalytic reduction reactor unit; transferring at least a portion of the liquor phase to the first catalytic reduction reactor unit; forming a first reaction product in the first catalytic reduction reactor unit; recirculating at least a portion of the liquor phase to the hydrothermal digestion unit at a first flow rate; and altering the first flow rate to increase or decrease a temperature of the liquor phase in the first fluid circulation loop.

In some embodiments, providing a cellulosic biomass in the hydrothermal digestion unit may comprise continuously or semi-continuously adding a cellulosic biomass to the hydrothermal digestion unit without the hydrothermal digestion unit being depressurized, particularly to atmospheric pressure. In some embodiments, after the cellulosic biomass is added to the hydrothermal digestion unit, the pressure in the hydrothermal digestion unit may be at least about 30 bar. Further pressurization after addition of the biomass may take place, if desired. In some embodiments, the hydrothermal digestion unit may be at a pressure less than or equal to that of the pressurization zone used to introduce the biomass into the digestion unit. In embodiments in which the digestion unit pressure is lower than that of the pressurization zone, the biomass and any liquor phase introduced to the pressurization zone may surge into the digestion unit when pressure isolation between the two is removed. In such embodiments, the digestion unit may be at a higher pressure than it was prior to biomass addition. In other embodiments, the pressure in the hydrothermal digestion unit may be greater than or equal to that of the pressurization zone used to introduce the biomass into the digestion unit. In embodiments in which the digestion unit is at a higher pressure than the pressurization zone, there may be a surge from the digestion unit into the pressurization zone after pressure isolation between the two is removed, after which time at least a portion of the biomass solids in the pressurization zone may gravity drop into the digestion unit. In such embodiments, the digestion unit may be at a lower pressure than it was prior to biomass addition. Further, in such embodiments, the pressurization zone may serve dual in digestion and biomass addition functions. Further details in this regard are described in commonly owned U.S. Patent Applications Ser. Nos. 61/576,664 and 61/576,691, filed concurrently herewith, and previously incorporated by reference hereinabove.

In some embodiments, the present methods may optionally further comprise performing a phase separation of the first reaction product from the first catalytic reduction reactor unit to form an aqueous phase and an organic phase. In some embodiments, the aqueous phase may be recirculated to the hydrothermal digestion unit. In some or other embodiments, at least a portion of the organic phase may be recirculated to the hydrothermal digestion unit. In still other embodiments, a mixed aqueous phase/organic phase mixture may be recirculated to the hydrothermal digestion unit. Suitable phase separation techniques have been set forth hereinabove.

In some embodiments, the present methods may optionally further comprise performing a phase separation of the second reaction product from the second catalytic reduction reactor unit into an aqueous phase and an organic phase. In some embodiments, the methods may further comprise recirculating at least a portion of the organic phase to the first fluid circulation line. In some embodiments, at least a portion of the organic phase may be withdrawn from the second fluid circulation loop and further converted into a biofuel. Suitable phase separation techniques have been set forth hereinabove.

The reaction products produced from the catalytic reduction reactor units may be converted into a biofuel according to the present embodiments. Processes for converting the reaction products into a biofuel are set forth in more detail hereinbelow. In some embodiments, the first reaction product may be converted into a biofuel, where the first reaction product is first subjected to a catalytic reduction reaction in the second catalytic reduction reactor unit prior to being converted into a biofuel. In some embodiments, the second reaction product may be converted into a biofuel, as described in more detail hereinbelow. Subsequent transformations for converting a reaction product into a biofuel may include, for example, further catalytic reduction reactions (e.g., hydrogenolysis reactions, hydrogenation reactions, hydrotreating reactions, and the like), condensation reactions, isomerization reactions, desulfurization reactions, dehydration reactions, oligomerization reactions, alkylation reactions, and the like.

In some embodiments, the present methods may further comprise transferring at least a portion of the first reaction product to the second fluid circulation loop, forming a second reaction product in the second catalytic reduction reactor unit, and recirculating at least a portion of the second reaction product to the first fluid circulation loop at a second flow rate. In some embodiments, the methods may further comprise withdrawing at least a portion of the second reaction product from the second fluid circulation loop. In some embodiments, the second reaction product withdrawn from the second fluid circulation loop may be converted into a biofuel.

By recirculating a liquor phase with the fluid circulation loops of the present biomass conversion systems, more efficient digestion of cellulosic biomass may be realized and degradation of soluble carbohydrates may be lessened. Various recycle ratios within the first and second fluid circulation loops may be used to accomplish the foregoing. As used herein, the term "recycle ratio" will refer to the amount of a liquor phase that is recirculated within a fluid circulation loop relative to the amount of a liquor phase that is withdrawn from the fluid circulation loop. By controlling recycle ratios according to the present embodiments, temperature control of the liquor phase and residence time of soluble carbohydrates within the hydrothermal digestion unit may be controlled. In addition, by regulating the recycle ratios, the relative composition of the liquor phase may be controlled, particularly within the first fluid circulation loop. By controlling the relative composition of the liquor phase, the risk of lignin precipitation may be lessened, particularly within the first fluid circulation loop. In various embodiments, the recycle ratios may be regulated by controlling the flow rates within the fluid circulation loops.

In some embodiments, the present methods may further comprise monitoring the temperature of the liquor phase in the first fluid circulation loop. As noted previously, the temperature may be increased or decreased by altering the first flow rate within the first fluid circulation loop. That is, by altering the recycle ratio within the first fluid circulation loop, the temperature may be increased or decreased, as desired. In some or other embodiments, the temperature in the first fluid circulation loop may also be altered somewhat by adjusting the second flow rate within the second fluid circulation loop. Generally, the recycle ratio within the first fluid circulation loop is larger than that within the second fluid circulation loop, as described below, and, accordingly, the recycle ratio of the second fluid circulation loop may have a lesser impact on temperature within the first fluid circulation loop, since less liquor phase is being returned to the first fluid circulation loop. By regulating the flow rates, in various embodiments, the liquor phase may enter the first catalytic reduction reactor unit at a temperature ranging between about 120° C. and about 190° C. and exit the first catalytic reduction reactor unit at a temperature ranging between about 260° C. and about 275° C. At these temperatures, a pressure of at least about 30 bar may be present in the hydrothermal digestion unit. As described above, the excess heat in the liquor phase may be input to the digestion process. Further, the amount of heat input may be regulated by controlling the recycle ratios of the first fluid circulation loop and/or the second fluid circulation loop.

In some embodiments, the recycle ratio of the first fluid circulation loop may be greater than that of the second fluid circulation loop. By utilizing a high recycle ratio in the first fluid circulation loop, degradation of soluble carbohydrates may be lessened by decreasing the residence time of the liquor phase in the hydrothermal digestion unit. In some embodiments, the first flow rate within the first fluid circulation loop may be such that the liquor phase spends about 4 hours or less in the hydrothermal digestion unit before being transferred to the first catalytic reduction reactor unit. In some embodiments, the first flow rate within the first fluid circulation loop is such that the liquor phase spends about 3 hours or less in the hydrothermal digestion unit before being transferred to the first catalytic reduction reactor unit. In some embodiments, the first flow rate within the first fluid circulation loop is such that the liquor phase spends about 2 hours or less in the hydrothermal digestion unit before being transferred to the first catalytic reduction reactor unit. In some embodiments, the first flow rate within the first fluid circulation loop is such that the liquor phase spends about 1 hour or less in the hydrothermal digestion unit before being transferred to the first catalytic reduction reactor unit. In some embodiments, the first flow rate within the first fluid circulation loop is such that the liquor phase spends about 0.5 hours or less in the hydrothermal digestion unit before being transferred to the first catalytic reduction reactor unit.

In various embodiments, the recycle ratio within the first circulation loop may range between about 2 and about 20. In some embodiments, the first flow rate within the first fluid circulation loop may be such that the liquor phase is recirculated in the first fluid circulation loop at a recycle ratio of at least about 2. In some embodiments, the first flow rate within the first fluid circulation loop may be such that the liquor phase is recirculated in the first fluid circulation loop at a recycle ratio of up to about 20. In some embodiments, the first flow rate within the first fluid circulation loop may be such that the liquor phase is recirculated in the first fluid circulation loop at a recycle ratio ranging between about 4 and about 10. As one of ordinary skill in the art will recognize, at higher recycle ratios, there will be a greater opportunity for soluble carbohydrates derived from cellulosic biomass to be transformed into a reaction product, since the liquor phase will pass through the first catalytic reduction reactor unit a greater number of times. Higher recycle ratios also may be favorable for inhibiting the degradation of soluble carbohydrates, as discussed above. As one of ordinary skill in the art will further recognize, if the recycle ratio is too large, however, an unsatisfactorily low amount of reaction product may be withdrawn from the fluid circulation loop for subsequent processing into a biofuel. Given the benefit of the present disclosure, one having ordinary skill in the art will be able to determine an appropriate recycle ratio for the first fluid circulation loop that achieves a desired amount of heat integration, while balancing a desired rate of downstream biofuel production.

In various embodiments, at least about 50% of the second reaction product formed in the second catalytic reduction reactor unit may be withdrawn from the second fluid circulation loop and further processed into a biofuel, as described further hereinbelow. As in the first fluid circulation loop, the recycle ratio may be regulated by controlling the second flow rate in the second fluid circulation loop. In some embodiments, at least about 10% of the second reaction product may be recirculated to the first fluid circulation loop. In some embodiments, the second flow rate in the second fluid circulation loop may be such that the second reaction product is recirculated to the first fluid circulation loop at a recycle ratio of at least about 0.1. In some or other embodiments, the second flow rate in the second fluid circulation loop may be such that the second reaction product is recirculated to the first fluid circulation loop at a recycle ratio ranging between about 0.1 and about 0.5.

In some embodiments, the second reaction product being recirculated to the first recirculation loop may comprise a higher percentage of organic compounds than it does water. For example, a separation of the reaction product may optionally take place after the first catalytic reduction reaction unit and/or the second catalytic reduction reactor unit. By using these optional separations, an aqueous stream that is originally fairly dilute in organic compounds may be enriched to a stream rich in organic compounds. Specifically, in some embodiments, the second reaction product may comprise more organic compounds than it does water.

In some embodiments, the second flow rate in the second fluid circulation loop may be such that a sufficient quantity of the second reaction product is recirculated to the first fluid circulation loop to inhibit lignins from precipitating. If the optional separation steps described above are performed, the flow rate sufficient to maintain lignin solubility will generally be lower, since the second reaction product may be more enriched in organic solvents. In some embodiments, by recirculating at least a portion of the second reaction product to the first fluid circulation loop, the quantity of soluble lignins may be made higher than if recirculation of the second reaction product were not performed. In the event that the lignin concentration exceeds the solubility limit, the present biomass conversion systems may also include one or more lignin removal lines at any point in the first fluid circulation loop.

In some embodiments, the methods described herein may further comprise converting a hydrolysate comprising soluble carbohydrates into a biofuel. In some embodiments, conversion of the hydrolysate into a biofuel may begin with a first catalytic reduction reaction in the first fluid circulation loop, as described above. In some embodiments, conversion of the hydrolysate into a biofuel may continue with a second catalytic reduction reaction, for example, in the second fluid circulation loop, as described above. According to the present embodiments, the reaction product from the second catalytic reduction reaction may be further transformed by any number of further catalytic reforming reactions including, for example, further catalytic reduction reactions (e.g., hydrogenolysis reactions, hydrogenation reactions, hydrotreating reactions, and the like), condensation reactions, isomerization reactions, desulfurization reactions, dehydration reactions, alkylation reactions, oligomerization reactions, and the like. A description of some of these processes follows.

Oxygenated intermediates produced from a catalytic reduction reaction may be processed to produce a fuel blend in one or more processing reactions. In an embodiment, a condensation reaction may be used along with other reactions to generate a fuel blend and may be catalyzed by a catalyst comprising an acid, a base, or both. In general, without being limited to any particular theory, it is believed that the basic condensation reactions may involve a series of steps involving: (1) an optional dehydrogenation reaction; (2) an optional dehydration reaction that may be acid catalyzed; (3) an aldol condensation reaction; (4) an optional ketonization reaction; (5) an optional furanic ring opening reaction; (6) hydrogenation of the resulting condensation products to form a $\geq C_4$ hydrocarbon; and (7) any combination thereof. Acid catalyzed condensations may similarly entail optional hydrogenation or dehydrogenation reactions, dehydration, and oligomerization reactions. Additional polishing reactions may also be used to conform the product to a specific fuel standard, including reactions conducted in the presence of hydrogen and a hydrogenation catalyst to remove functional groups from final fuel product. In some embodiments, a basic catalyst, a catalyst having both an acid and a base functional site, and optionally comprising a metal function, may also be used to effect the condensation reaction.

In some embodiments, an aldol condensation reaction may be used to produce a fuel blend meeting the requirements for a diesel fuel or jet fuel. Traditional diesel fuels are petroleum distillates rich in paraffinic hydrocarbons. They have boiling ranges as broad as 187° C. to 417° C., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 may be defined as diesel fuel.

The present disclosure also provides methods to produce jet fuel. Jet fuel is clear to straw colored. The most common fuel is an unleaded/paraffin oil-based fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosene-type Airplane fuel (including Jet A and Jet A-1) has a carbon number distribution between about C8 and C16. Wide-cut or naphtha-type Airplane fuel (including Jet B) typically has a carbon number distribution between about C5 and C15. A fuel blend meeting ASTM D1655 may be defined as jet fuel.

In certain embodiments, both Airplanes (Jet A and Jet B) contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors (e.g., DCI-4A) are used for civilian and military fuels, and DCI-6A is used for military fuels. FSII agents, include, for example, Di-EGME.

In some embodiments, the oxygenated intermediates may comprise a carbonyl-containing compound that may take part in a base catalyzed condensation reaction. In some embodiments, an optional dehydrogenation reaction may be used to increase the amount of carbonyl-containing compounds in the oxygenated intermediate stream to be used as a feed to the condensation reaction. In these embodiments, the oxygenated intermediates and/or a portion of the bio-based feedstock stream may be dehydrogenated in the presence of a catalyst.

In some embodiments, a dehydrogenation catalyst may be preferred for an oxygenated intermediate stream comprising alcohols, diols, and triols. In general, alcohols cannot participate in aldol condensation directly. The hydroxyl group or groups present may be converted into carbonyls (e.g., aldehydes, ketones, etc.) in order to participate in an aldol condensation reaction. A dehydrogenation catalyst may be included to effect dehydrogenation of any alcohols, diols, or polyols present to form ketones and aldehydes. The dehydration catalyst is typically formed from the same metals as used for hydrogenation, hydrogenolysis, or aqueous phase reforming. These catalysts are described in more detail above. Dehydrogenation yields may be enhanced by the removal or consumption of hydrogen as it forms during the reaction. The dehydrogenation step may be carried out as a separate reaction step before an aldol condensation reaction, or the dehydrogenation reaction may be carried out in concert with the aldol condensation reaction. For concerted dehydrogenation and aldol condensation reactions, the dehydrogenation and aldol condensation functions may take place on the same catalyst. For example, a metal hydrogenation/dehydrogenation functionality may be present on catalyst comprising a basic functionality.

The dehydrogenation reaction may result in the production of a carbonyl-containing compound. Suitable carbonyl-containing compounds may include, but are not limited to, any compound comprising a carbonyl functional group that may form carbanion species or may react in a condensation reaction with a carbanion species. In an embodiment, a carbonyl-containing compound may include, but is not limited to, ketones, aldehydes, furfurals, hydroxy carboxylic acids, and, carboxylic acids. Ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, dihydroxyacetone, and isomers thereof. Aldehydes may include, without limitation, hydroxyaldehydes, acetaldehyde, glyceraldehyde, propionaldehyde, butyraldehyde, pentanal, hexanal, heptanal, octanal, nonal, decanal, undecanal, dodecanal, and isomers thereof. Carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Furfurals may include, without limitation, hydroxylmethylfurfural, 5-hydroxymethyl-2(5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof. In an embodiment, the dehydrogenation reaction may result in the production of a carbonyl-containing compound that is combined with the oxygenated intermediates to become a part of the oxygenated intermediates fed to the condensation reaction.

In an embodiment, an acid catalyst may be used to optionally dehydrate at least a portion of the oxygenated intermediate stream. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in solution.

In some embodiments, the dehydration reaction may occur in the vapor phase. In other embodiments, the dehydration reaction may occur in the liquid phase. For liquid phase dehydration reactions, an aqueous solution may be used to carry out the reaction. In an embodiment, other solvents in addition to water, may be used to form the aqueous solution. For example, water soluble organic solvents may be present. Suitable solvents may include, but are not limited to, hydroxymethylfurfural (HMF), dimethylsulfoxide (DMSO), 1-methyl-n-pyrollidone (NMP), and any combination thereof. Other suitable aprotic solvents may also be used alone or in combination with any of these solvents.

In an embodiment, the processing reactions may comprise an optional ketonization reaction. A ketonization reaction may increase the number of ketone functional groups within at least a portion of the oxygenated intermediates. For example, an alcohol may be converted into a ketone in a ketonization reaction. Ketonization may be carried out in the presence of a basic catalyst. Any of the basic catalysts described above as the basic component of the aldol condensation reaction may be used to effect a ketonization reaction. Suitable reaction conditions are known to one of ordinary skill in the art and generally correspond to the reaction conditions listed above with respect to the aldol condensation reaction. The ketonization reaction may be carried out as a separate reaction step, or it may be carried out in concert with the aldol condensation reaction. The inclusion of a basic functional site on the aldol condensation catalyst may result in concerted ketonization and aldol condensation reactions.

In an embodiment, the processing reactions may comprise an optional furanic ring opening reaction. A furanic ring opening reaction may result in the conversion of at least a portion of any oxygenated intermediates comprising a furanic ring into compounds that are more reactive in an aldol condensation reaction. A furanic ring opening reaction may be carried out in the presence of an acidic catalyst. Any of the acid catalysts described above as the acid component of the aldol condensation reaction may be used to effect a furanic ring opening reaction. Suitable reaction conditions are known to one of ordinary skill in the art and generally correspond to the reaction conditions listed above with respect to the aldol condensation reaction. The furanic ring opening reaction may be carried out as a separate reaction step, or it may be carried out in concert with the aldol condensation reaction. The inclusion of an acid functional site on the aldol condensation catalyst may result in a concerted furanic ring opening reaction and aldol condensation reactions. Such an embodiment may be advantageous as any furanic rings may be opened in the presence of an acid functionality and reacted in an aldol condensation reaction using a basic functionality. Such a concerted reaction scheme may allow for the production of a greater amount of higher hydrocarbons to be formed for a given oxygenated intermediate feed.

In an embodiment, production of a $\geq C_4$ compound may occur by condensation, which may include aldol condensation of the oxygenated intermediates in the presence of a condensation catalyst. Aldol-condensation generally involves the carbon-carbon coupling between two compounds, at least one of which may contain a carbonyl group, to form a larger organic molecule. For example, acetone may react with hydroxymethylfurfural to form a $C_9$ species, which may subsequently react with another hydroxymethylfurfural molecule to form a $C_{15}$ species. In various embodiments, the reaction is usually carried out in the presence of a condensation catalyst. The condensation reaction may be carried out in the vapor or liquid phase. In an embodiment, the reaction may take place at a temperature ranging from about 7° C. to about 377° C. depending on the reactivity of the carbonyl group.

The condensation catalyst will generally be a catalyst capable of forming longer chain compounds by linking two molecules through a new carbon-carbon bond, such as a basic catalyst, a multi-functional catalyst having both acid and base functionalities, or either type of catalyst also comprising an optional metal functionality. In an embodiment, the multi-functional catalyst may be a catalyst having both a strong acid and a strong base functionalities. In an embodiment, aldol catalysts may comprise Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In an embodiment, the base catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In an embodiment, the condensation catalyst comprises mixed-oxide base catalysts. Suitable mixed-oxide base catalysts may comprise a combination of magnesium, zirconium, and oxygen, which may comprise, without limitation: Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combinations thereof. Different atomic ratios of Mg/Zr or the combinations of various other elements constituting the mixed oxide catalyst may be used ranging from about 0.01 to about 50. In an embodiment, the condensation catalyst may further include a metal or alloys comprising metals, such as Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Such metals may be preferred when a dehydrogenation reaction is to be carried out in concert with the aldol condensation reaction. In an embodiment, preferred Group IA materials may include Li, Na, K, Cs and Rb. In an embodiment, preferred Group IIA materials may include Mg, Ca, Sr and Ba. In an embodiment, Group IIB materials may include Zn and Cd. In an embodiment, Group IIIB materials may include Y and La. Basic resins may include resins that exhibit basic functionality. The basic catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In one embodiment, the condensation catalyst may be derived from the combination of MgO and $Al_2O_3$ to form a hydrotalcite material. Another preferred material contains ZnO and $Al_2O_3$ in the form of a zinc aluminate spinel. Yet another preferred material is a combination of ZnO, $Al_2O_3$, and CuO. Each of these materials may also contain an additional metal function provided by a Group VIIIB metal, such as Pd or Pt. Such metals may be preferred when a dehydrogenation reaction is to be carried out in concert with the aldol condensation reaction. In one embodiment, the basic catalyst may be a metal oxide containing Cu, Ni, Zn, V, Zr, or mixtures thereof. In another embodiment, the basic catalyst may be a zinc aluminate metal containing Pt, Pd Cu, Ni, or mixtures thereof.

In some embodiments, a base-catalyzed condensation reaction may be performed using a condensation catalyst with both an acidic and basic functionality. The acid-aldol condensation catalyst may comprise hydrotalcite, zinc-aluminate, phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the acid-base catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and combinations thereof. In an embodiment, the acid-base catalyst may include a metal functionality provided by Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. In one embodiment, the catalyst further includes Zn, Cd or phosphate. In one embodiment, the condensation catalyst may be a metal oxide containing Pd, Pt, Cu or Ni, and even more preferably an aluminate or zirconium metal oxide containing Mg and Cu, Pt, Pd or Ni. The acid-base catalyst may also include a hydroxyapatite (HAP) combined with any one or more of the above metals. The acid-base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In an embodiment, the condensation catalyst may also include zeolites and other microporous supports that contain Group IA compounds, such as Li, NA, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In one embodiment, the condensation catalyst may be derived from the combination of MgO and $Al_2O_3$ to form a hydrotalcite material. Another preferred material may contain a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation catalyst may be self-supporting (i.e., the catalyst does not need another material to serve as a support), or may require a separate support suitable for suspending the catalyst in the reactant stream. One exemplary support is silica, especially silica having a high surface area (greater than 100 square meters per gram), obtained by sol-gel synthesis, precipitation, or fuming. In other embodiments, particularly when the condensation catalyst is a powder, the catalyst system may include a binder to assist in forming the catalyst into a desirable catalyst shape. Applicable forming processes may include extrusion, pelletization, oil dropping, or other known processes. Zinc oxide, alumina, and a peptizing agent may also be mixed together and extruded to produce a formed material. After drying, this material may be calcined at a temperature appropriate for formation of the catalytically active phase. Other catalyst supports as known to one having ordinary skill in the art may also be used.

In some embodiments, a dehydration catalyst, a dehydrogenation catalyst, and the condensation catalyst may be present in the same reactor as the reaction conditions overlap to some degree. In these embodiments, a dehydration reaction and/or a dehydrogenation reaction may occur substantially simultaneously with the condensation reaction. In some embodiments, a catalyst may comprise active sites for a dehydration reaction and/or a dehydrogenation reaction in addition to a condensation reaction. For example, a catalyst may comprise active metals for a dehydration reaction and/or a dehydrogenation reaction along with a condensation reaction at separate sites on the catalyst or as alloys. Suitable active elements may comprise any of those listed above with respect to the dehydration catalyst, dehydrogenation catalyst, and the condensation catalyst. Alternately, a physical mixture of dehydration, dehydrogenation, and condensation catalysts may be employed. While not intending to be limited by theory, it is believed that using a condensation catalyst comprising a metal and/or an acid functionality may assist in pushing the equilibrium limited aldol condensation reaction towards completion. Advantageously, this may be used to effect multiple condensation reactions with dehydration and/or dehydrogenation of intermediates, in order to form (via condensation, dehydration, and/or dehydrogenation) higher molecular weight oligomers as desired to produce jet or diesel fuel.

The specific $\geq C_4$ compounds produced in the condensation reaction may depend on various factors, including, without limitation, the type of oxygenated intermediates in the reactant stream, condensation temperature, condensation pressure, the reactivity of the catalyst, and the flow rate of the reactant stream.

In general, the condensation reaction may be carried out at a temperature at which the thermodynamics of the proposed reaction are favorable. For condensed phase liquid reactions, the pressure within the reactor must be sufficient to maintain at least a portion of the reactants in the condensed liquid phase at the reactor inlet. For vapor phase reactions, the reaction should be carried out at a temperature where the vapor pressure of the oxygenates is at least about 0.1 bar, and the thermodynamics of the reaction are favorable. The condensation temperature will vary depending upon the specific oxygenated intermediates used, but may generally range between about 77° C. and about 500° C. for reactions taking place in the vapor phase, and more preferably range between about 125° C. and about 450° C. For liquid phase reactions, the condensation temperature may range between about 5° C. and about 475° C., and the condensation pressure may range between about 0.01 bar and about 100 bar. Preferably, the condensation temperature may range between about 15° C. and about 300° C., or between about 15° C. and 250° C.

Varying the factors above, as well as others, will generally result in a modification to the specific composition and yields of the $\geq C_4$ compounds. For example, varying the temperature and/or pressure of the reactor system, or the particular catalyst formulations, may result in the production of $\geq C_4$ alcohols and/or ketones instead of $\geq C_4$ hydrocarbons. The $\geq C_4$ hydrocarbon product may also contain a variety of olefins, and alkanes of various sizes (typically branched alkanes). Depending upon the condensation catalyst used, the hydrocarbon product may also include aromatic and cyclic hydrocarbon compounds. The $\geq C_4$ hydrocarbon product may also contain undesirably high levels of olefins, which may lead to coking or deposits in combustion engines, or other undesirable hydrocarbon products. In such cases, the hydrocarbons may optionally be hydrogenated to reduce the ketones to alcohols and hydrocarbons, while the alcohols and olefinic hydrocarbons may be reduced to alkanes, thereby forming a more desirable hydrocarbon product having reduced levels of olefins, aromatics or alcohols.

The condensation reactions may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reactions.

In a continuous flow system, the reactor system may include an optional dehydrogenation bed adapted to produce dehydrogenated oxygenated intermediates, an optional dehydration bed adapted to produce dehydrated oxygenated intermediates, and a condensation bed adapted to produce $\geq C_4$ compounds from the oxygenated intermediates. The dehydrogenation bed may be configured to receive the reactant stream and produce the desired oxygenated intermediates, which may have an increase in the amount of carbonyl-containing compounds. The dehydration bed may be configured to receive the reactant stream and produce the desired oxygenated intermediates. The condensation bed may be configured to receive the oxygenated intermediates for contact with the condensation catalyst and production of the desired $\geq C_4$ compounds. For systems with one or more finishing steps, an additional reaction bed for conducting the finishing process or processes may be included after the condensation bed.

In an embodiment, the optional dehydration reaction, the optional dehydrogenation reaction, the optional ketonization reaction, the optional ring opening reaction, and the condensation reaction catalyst beds may be positioned within the same reactor vessel or in separate reactor vessels in fluid communication with each other. Each reactor vessel preferably may include an outlet adapted to remove the product stream from the reactor vessel. For systems with one or more finishing steps, the finishing reaction bed or beds may be within the same reactor vessel along with the condensation bed or in a separate reactor vessel in fluid communication with the reactor vessel having the condensation bed.

In an embodiment, the reactor system also may include additional outlets to allow for the removal of portions of the reactant stream to further advance or direct the reaction to the desired reaction products, and to allow for the collection and recycling of reaction byproducts for use in other portions of the system. In an embodiment, the reactor system also may include additional inlets to allow for the introduction of supplemental materials to further advance or direct the reaction to the desired reaction products, and to allow for the recycling of reaction byproducts for use in other reactions.

In an embodiment, the reactor system also may include elements which allow for the separation of the reactant stream into different components which may find use in different reaction schemes or to simply promote the desired reactions. For instance, a separator unit, such as a phase separator, extractor, purifier or distillation column, may be installed prior to the condensation step to remove water from the reactant stream for purposes of advancing the condensation reaction to favor the production of higher hydrocarbons. In an embodiment, a separation unit may be installed to remove specific intermediates to allow for the production of a desired product stream containing hydrocarbons within a particular carbon number range, or for use as end products or in other systems or processes.

The condensation reaction may produce a broad range of compounds with carbon numbers ranging from $C_4$ to $C_{30}$ or greater. Exemplary compounds may include, for example, $\geq C_4$ alkanes, $\geq C_4$ alkenes, $\geq C_5$ cycloalkanes, $\geq C_5$ cycloalkenes, aryls, fused aryls, $\geq C_4$ alcohols, $\geq C_4$ ketones, and mixtures thereof. The $\geq C_4$ alkanes and $\geq C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The $\geq C_4$ alkanes and $\geq C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various $\geq C_4$ alkanes and $\geq C_4$ alkenes may include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The $\geq C_5$ cycloalkanes and $\geq C_5$ cycloalkenes may have from 5 to about 30 carbon atoms and may be unsubstituted, mono-substituted or multi-substituted. In the case of monosubstituted and multi-substituted compounds, the substituted group may include a branched $\geq C_3$ alkyl, a straight chain $\geq C_1$ alkyl, a branched $\geq C_3$ alkylene, a straight chain $\geq C_1$ alkylene, a straight chain $\geq C_2$ alkylene, an aryl group, or a combination thereof. In one embodiment, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet another embodiment, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of desirable $\geq C_5$ cycloalkanes and $\geq C_5$ cycloalkenes may include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

Aryl groups contain an aromatic hydrocarbon in either an unsubstituted (phenyl), mono-substituted or multi-substituted form. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_2$ alkylene, a phenyl group, or a combination thereof. In one embodiment, at least one of the substituted groups may include a branched $C_3$-$C_{12}$ alkyl, a straight chain $C_1$-$C_{12}$ alkyl, a branched $C_3$-$C_{12}$ alkylene, a straight chain $C_2$-$C_{12}$ alkylene, a phenyl group, or any combination thereof. In yet another embodiment, at least one of the substituted groups may include a branched $C_3$-$C_4$ alkyl, a straight chain $C_1$-$C_4$ alkyl, a branched $C_3$-$C_4$ alkylene, a straight chain $C_2$-$C_4$ alkylene, a phenyl group, or any combination thereof. Examples of various aryl compounds may include, without limitation, benzene, toluene, xylene (dimethylbenzene), ethyl benzene, para-xylene, meta-xylene, ortho-xylene, and $C_9$ aromatics.

Fused aryls contain bicyclic and polycyclic aromatic hydrocarbons, in either an unsubstituted, mono-substituted or multi-substituted form. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_2$ alkylene, a phenyl group, or a combination thereof. In another embodiment, at least one of the substituted groups may include a branched $C_3$-$C_4$ alkyl, a straight chain $C_1$-$C_4$ alkyl, a branched $C_3$-$C_4$ alkylene, a straight chain $C_2$-$C_4$ alkylene, a phenyl group, or any combination thereof. Examples of various fused aryls may include, without limitation, naphthalene, anthracene, tetrahydronaphthalene, and decahydronaphthalene, indane, indene, and isomers thereof.

The moderate fractions, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The $\geq C_4$ compounds may also find use as industrial chemicals, whether as an intermediate or an end product. For example, the aryls toluene, xylene, ethylbenzene, para-xylene, meta-xylene, and ortho-xylene may find use as chemical intermediates for the production of plastics and other products. Meanwhile, $C_9$ aromatics and fused aryls, such as naphthalene, anthracene, tetrahydronaphthalene, and decahydronaphthalene, may find use as solvents in industrial processes.

In an embodiment, additional processes may be used to treat the fuel blend to remove certain components or further conform the fuel blend to a diesel or jet fuel standard. Suitable techniques may include hydrotreating to reduce the amount of or remove any remaining oxygen, sulfur, or nitrogen in the fuel blend. The conditions for hydrotreating a hydrocarbon stream are known to one of ordinary skill in the art.

In an embodiment, hydrogenation may be carried out in place of or after the hydrotreating process to saturate at least some olefinic bonds. In some embodiments, a hydrogenation reaction may be carried out in concert with the aldol condensation reaction by including a metal functional group with the aldol condensation catalyst. Such hydrogenation may be performed to conform the fuel blend to a specific fuel standard (e.g., a diesel fuel standard or a jet fuel standard). The hydrogenation of the fuel blend stream may be carried out according to known procedures, either with the continuous or batch method. The hydrogenation reaction may be used to remove remaining carbonyl groups and/or hydroxyl groups. In such cases, any of the hydrogenation catalysts described above may be used. In general, the finishing step may be carried out at finishing temperatures ranging between about 80° C. and about 250° C., and finishing pressures may range between about 5 bar and about 150 bar. In one embodiment, the finishing step may be conducted in the vapor phase or liquid phase, and use, external hydrogen, recycled hydrogen, or combinations thereof, as necessary.

In an embodiment, isomerization may be used to treat the fuel blend to introduce a desired degree of branching or other shape selectivity to at least some components in the fuel blend. It may also be useful to remove any impurities before the hydrocarbons are contacted with the isomerization catalyst. The isomerization step may comprise an optional stripping step, wherein the fuel blend from the oligomerization reaction may be purified by stripping with water vapor or a suitable gas such as light hydrocarbon, nitrogen or hydrogen. The optional stripping step may be carried out in a countercurrent manner in a unit upstream of the isomerization catalyst, wherein the gas and liquid are contacted with each other, or before the actual isomerization reactor in a separate stripping unit utilizing countercurrent principle.

After the optional stripping step the fuel blend may be passed to a reactive isomerization unit comprising one or more catalyst beds. The catalyst beds of the isomerization unit may operate either in co-current or countercurrent manner. In the isomerization unit, the pressure may vary between about 20 bar to about 150 bar, preferably between about 20 bar to about 100 bar, the temperature ranging between about 190° C. and about 500° C., preferably between about 300° C. and about 400° C. In the isomerization unit, any isomerization catalyst known in the art may be used. In some embodiments, suitable isomerization catalysts may contain molecular sieve and/or a metal from Group VII and/or a carrier. In an embodiment, the isomerization catalyst may contain SAPO-11 or SAPO41 or ZSM-22 or ZSM-23 or ferrierite and Pt, Pd or Ni and $Al_2O_3$ or $SiO_2$. Typical isomerization catalysts are, for example, $Pt/SAPO-11/Al_2O_3$, $Pt/ZSM-22/Al_2O_3$, $Pt/ZSM-23/Al_2O_3$ and $Pt/SAPO-11/SiO_2$.

Other factors, such as the concentration of water or undesired oxygenated intermediates, may also effect the composition and yields of the $\geq C_4$ compounds, as well as the activity and stability of the condensation catalyst. In such cases, the process may include a dewatering step that removes a portion of the water prior to the condensation reaction and/or the optional dehydration reaction, or a separation unit for removal of the undesired oxygenated intermediates. For instance, a separator unit, such as a phase separator, extractor, purifier or distillation column, may be installed prior to the condensation reactor so as to remove a portion of the water from the reactant stream containing the oxygenated intermediates. A separation unit may also be installed to remove specific oxygenated intermediates to allow for the production of a desired product stream containing hydrocarbons within a particular carbon range, or for use as end products or in other systems or processes.

Thus, in one embodiment, the fuel blend produced by the processes described herein is a hydrocarbon mixture that meets the requirements for jet fuel (e.g., conforms with ASTM D1655). In another embodiment, the product of the processes described herein is a hydrocarbon mixture that comprises a fuel blend meeting the requirements for a diesel fuel (e.g., conforms with ASTM D975).

In another embodiment, a fuel blend comprising gasoline hydrocarbons (i.e., a gasoline fuel) may be produced. "Gasoline hydrocarbons" refer to hydrocarbons predominantly comprising $C_{5-9}$ hydrocarbons, for example, $C_{6-8}$ hydrocarbons, and having a boiling point range from 32° C. (90° F.) to about 204° C. (400° F.). Gasoline hydrocarbons may include, but are not limited to, straight run gasoline, naphtha, fluidized or thermally catalytically cracked gasoline, VB gasoline, and coker gasoline. Gasoline hydrocarbons content is determined by ASTM Method D2887.

In yet another embodiment, the $\geq C_2$ olefins may be produced by catalytically reacting the oxygenated intermediates in the presence of a dehydration catalyst at a dehydration temperature and dehydration pressure to produce a reaction stream comprising the $\geq C_2$ olefins. The $\geq C_2$ olefins may comprise straight or branched hydrocarbons containing one or more carbon-carbon double bonds. In general, the $\geq C_2$ olefins may contain from 2 to 8 carbon atoms, and more preferably from 3 to 5 carbon atoms. In one embodiment, the olefins may comprise propylene, butylene, pentylene, isomers of the foregoing, and mixtures of any two or more of the foregoing. In another embodiment, the $\geq C_2$ olefins may include $\geq C_4$ olefins produced by catalytically reacting a portion of the $\geq C_2$ olefins over an olefin isomerization catalyst.

The dehydration catalyst may comprise a member selected from the group consisting of an acidic alumina, aluminum phosphate, silica-alumina phosphate, amorphous silica-alumina, aluminosilicate, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. In one embodiment, the dehydration catalyst may further comprise a modifier selected from the group consisting of Ce, Y, Sc, La, Li, Na, K, Rb, Cs, Mg, Ca, Sr, Ba, P, B, Bi, and a combination of any two or more of the foregoing. In another embodiment, the dehydration catalyst may further comprise an oxide of an element, the element selected from the group consisting of Ti, Zr, V, Nb, Ta, Mo, Cr, W, Mn, Re, Al, Ga, In, Fe, Co, Ir, Ni, Si, Cu, Zn, Sn, Cd, P, and a combination of any two or more of the foregoing. In yet another embodiment, the dehydration catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In yet another embodiment, the dehydration catalyst may comprise an aluminosilicate zeolite. In some embodiments, the dehydration catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the dehydration catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the dehydration catalyst may comprise a bifunctional pentasil ring-containing aluminosilicate zeolite. In some embodiments, the dehydration catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the dehydration catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

The dehydration reaction may be conducted at a temperature and pressure where the thermodynamics are favorable. In general, the reaction may be performed in the vapor phase, liquid phase, or a combination of both. In one embodiment, the dehydration temperature may range between about 100° C. and about 500° C., and the dehydration pressure may range between about 1 bar (absolute) and about 60 bar. In another embodiment, the dehydration temperature may range between about 125° C. and about 450° C. In some embodiments, the dehydration temperature may range between about 150° C. and about 350° C., and the dehydration pressure may range between about 5 bar and about 50 bar. In yet another embodiment, the dehydration temperature may range between about 175° C. and about 325° C.

The $\geq C_6$ paraffins are produced by catalytically reacting $\geq C_2$ olefins with a stream of $\geq C_4$ isoparaffins in the presence of an alkylation catalyst at an alkylation temperature and alkylation pressure to produce a product stream comprising $\geq C_6$ paraffins. The $\geq C_4$ isoparaffins may include alkanes and cycloalkanes having 4 to 7 carbon atoms, such as isobutane, isopentane, naphthenes, and higher homologues having a tertiary carbon atom (e.g., 2-methylbutane and 2,4-dimethylpentane), isomers of the foregoing, and mixtures of any two or more of the foregoing. In one embodiment, the stream of $\geq C_4$ isoparaffins may comprise internally generated $\geq C_4$ isoparaffins, external $\geq C_4$ isoparaffins, recycled $\geq C_4$ isoparaffins, or combinations of any two or more of the foregoing.

The $\geq C_6$ paraffins may be branched paraffins, but may also include normal paraffins. In one version, the $\geq C_6$ paraffins may comprise a member selected from the group consisting of a branched $C_{6-10}$ alkane, a branched $C_6$ alkane, a branched $C_7$ alkane, a branched $C_8$ alkane, a branched $C_9$ alkane, a branched $C_{10}$ alkane, or a mixture of any two or more of the foregoing. In one version, the $\geq C_6$ paraffins may include, for example, dimethylbutane, 2,2-dimethylbutane, 2,3-dimethylbutane, methylpentane, 2-methylpentane, 3-methylpentane, dimethylpentane, 2,3-dimethylpentane, 2,4-dimethylpentane, methylhexane, 2,3-dimethylhexane, 2,3,4-trimethylpentane, 2,2,4-trimethylpentane, 2,2,3-trimethylpentane, 2,3,3-trimethylpentane, dimethylhexane, or mixtures of any two or more of the foregoing.

The alkylation catalyst may comprise a member selected from the group of sulfuric acid, hydrofluoric acid, aluminum chloride, boron trifluoride, solid phosphoric acid, chlorided alumina, acidic alumina, aluminum phosphate, silica-alumina phosphate, amorphous silica-alumina, aluminosilicate, aluminosilicate zeolite, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. The alkylation catalyst may also include a mixture of a mineral acid with a Friedel-Crafts metal halide, such as aluminum bromide, and other proton donors.

In one embodiment, the alkylation catalyst may comprise an aluminosilicate zeolite. In some embodiments, the alkylation catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the alkylation catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the alkylation catalyst may comprise a bifunctional pentasil ring-containing aluminosilicate zeolite. In some embodiments, the alkylation catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the alkylation catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing. In one version, the dehydration catalyst and the alkylation catalyst may be atomically identical.

The alkylation reaction may be conducted at a temperature where the thermodynamics are favorable. In general, the alkylation temperature may range between about −20° C. and about 300° C., and the alkylation pressure may range between about 1 bar (absolute) to 80 bar. In some embodiments, the alkylation temperature may range between about 100° C. and about 300° C. In another version, the alkylation temperature may range between about 0° C. and about 100° C. In yet other embodiments, the alkylation temperature may range between about 0° C. and about 50° C. In still other embodiments, the alkylation temperature may range between about 70° C. and about 250° C., and the alkylation pressure may range between about 5 bar and about 80 bar. In one embodiment, the alkylation catalyst may comprise a mineral acid or a strong acid. In another embodiment, the alkylation catalyst may comprise a zeolite and the alkylation temperature may be greater than about 100° C.

In an embodiment, an olefinic oligomerization reaction may conducted. The oligomerization reaction may be carried out in any suitable reactor configuration. Suitable configurations may include, but are not limited to, batch reactors, semi-batch reactors, or continuous reactor designs such as, for example, fluidized bed reactors with external regeneration vessels. Reactor designs may include, but are not limited to tubular reactors, fixed bed reactors, or any other reactor type suitable for carrying out the oligomerization reaction. In an embodiment, a continuous oligomerization process for the production of diesel and jet fuel boiling range hydrocarbons may be carried out using an oligomerization reactor for contacting an olefinic feed stream comprising short chain olefins having a chain length of from 2 to 8 carbon atoms with a zeolite catalyst under elevated temperature and pressure so as to convert the short chain olefins to a fuel blend in the diesel boiling range. The oligomerization reactor may be operated at relatively high pressures of about 20 bar to about 100 bar, and temperatures ranging between about 150° C. and about 300° C., preferably between about 200° C. to 250° C.

The resulting oligomerization stream results in a fuel blend that may have a wide variety of products including products comprising $C_5$ to $C_{24}$ hydrocarbons. Additional processing may be used to obtain a fuel blend meeting a desired standard. An initial separation step may be used to generate a fuel blend with a narrower range of carbon numbers. In an embodiment, a separation process such as a distillation process may be used to generate a fuel blend comprising $C_{12}$ to $C_{24}$ hydrocarbons for further processing. The remaining hydrocarbons may be used to produce a fuel blend for gasoline, recycled to the oligomerization reactor, or used in additional processes. For example, a kerosene fraction may be derived along with the diesel fraction and may either be used as an illuminating paraffin, as a jet fuel blending component in conventional crude or synthetic derived jet fuels, or as reactant (especially $C_{10}$ to $C_{13}$ fraction) in the process to produce LAB (Linear Alkyl Benzene). The naphtha fraction, after hydroprocessing, may be routed to a thermal cracker for the production of ethylene and propylene or routed to a catalytic cracker to produce ethylene, propylene, and gasoline.

Additional processes may be used to treat the fuel blend to remove certain components or further conform the fuel blend to a diesel or jet fuel standard. Suitable techniques may include hydrotreating to remove any remaining oxygen, sulfur, or nitrogen in the fuel blend. Hydrogenation may be carried after the hydrotreating process to saturate at least some olefinic bonds. Such hydrogenation may be performed to conform the fuel blend to a specific fuel standard (e.g., a diesel fuel standard or a jet fuel standard). The hydrogenation step of the fuel blend stream may be carried out according to the known procedures, in a continuous of batchwise manner.

To facilitate a better understanding of the present invention, the following examples of preferred embodiments are given. In no way should the following examples be read to limit, or to define, the scope of the invention.

EXAMPLES

Example 1

Catalytic Reduction of Sorbitol

Catalytic reduction of 20 grams of 50 wt. % sorbitol solution was examined in a 75-milliliter Parr5000 reactor operated at 240° C. under 75 bar of $H_2$ pressure, in the presence of 0.35 grams of 1.9% Pt/zirconia catalyst modified with rhenium at Re:Pt ratio of 3.75:1. The reaction was continued for 18 hours, before sampling the reaction mixture via a gas chromatographic mass spectrometry (GC-MS) method using a 60 mm×0.32 mm ID DB-5 column of 1 m thickness, with 50:1 split ratio, 2 ml/min helium flow, and column oven held at 40° C. for 8 minutes, followed by a ramp to 285° C. at 10° C./min., and a hold time of 53.5 minutes. The GC-MS results indicated greater than 90% conversion of sorbitol to mono-oxygenates and organic acid byproducts, as evidenced by a drop from neutral pH to 2.7. The reaction product comprised 20.3% ethanol by weight, 25.4% 1-propanol and 2-propanol by weight, and 2.5% dimethylketone (acetone) by weight. The presence of acetic acid was confirmed via an HPLC method using a Bio-Rad Aminex HPX-87H column (300 mm×7.8 mm) operated at 0.6 ml/min. of a 5 mM sulfuric acid in water mobile phase, at an oven temperature of 30° C., a run time of 70 minutes, and both RI and UV (320 nm) detectors.

Example 2

Digestion of Cellulosic Biomass

A digestion unit was constructed from ½-inch diameter by 1-foot long 316 stainless steel tubing, heated via an electric band heater (Gaumer Company, Inc.), and packed with 3.3-4.5 grams of nominal ⅛-inch by ¼-inch by 3-mm pine wood mini-chips (moisture content of 14% as determined by overnight drying in a vacuum oven at 85° C.). A solvent mixture was prepared to represent the principal reaction products from hydrocatalytic reduction of sorbitol carbohydrate in Example 1. The digestion solvent comprised 20 wt. % 2-propanol, 25 wt. % ethanol, 2 wt. % dimethylketone, and 2 wt. % acetic acid in deionized water to give a pH of about 2.7. For some runs, the solvent was neutralized to pH 5.4 via addition of 1 N KOH. Solvent was fed to the digestion unit via HPLC pump (Eldex).

The digestion unit and a product receiving vessel were pressured to 70 bar via charging the digestion unit with a solvent feed followed by addition of hydrogen from a 90 bar supply source. Results for a series of runs in which pH, temperatures $T_1$ and $T_2$, time, and solvent flowrate were varied are shown in Table 1. In conducting the experiments, the digestion unit and contents were heated to an initial temperature $T_1$ before establishing a digestion solvent feed flow at a target flowrate between 0.07 and 0.25 ml/min. Contacting with the flowing solvent was continued for a prescribed initial period of time, before raising the temperature to a second temperature $T_2$ to affect the hydrolysis of more difficult to digest components such as cellulose. Hydrolysate from digestion was collected in a pressurized product surge vessel also pre-pressurized to 70 bar via addition of $H_2$. Backpressure control on the digestion unit and product surge vessel enabled pressure to be maintained at 70 bar throughout the test procedure. Analysis of the undigested wood chips at the end of the run indicated the percent dissolution and digestion of the original wood charge.

TABLE 1

| Entry | $T_1$ (° C.) | $T_1$ (° C.) | Total Time (hr) | % Time at $T_1$ | pH | Total Throughput (mL) | % Digestion (%) | g/g wood/hr[1] |
|---|---|---|---|---|---|---|---|---|
| 1 | 190 | 240 | 5.4 | 51 | 5.5 | 7.6 | 91 | 1.41 |
| 2 | 180 | 240 | 6.6 | 40 | 5.5 | 13.3 | 70 | 2.00 |
| 3 | 190 | 220 | 4.6 | 73 | 5.5 | 10.7 | 39 | 2.31 |
| 4 | 180 | 240 | 4.6 | 46 | 2.7 | 10.1 | 74 | 2.20 |
| 5 | 180 | 240 | 6.3 | 28 | 5.5 | 23.1 | 88 | 3.64 |
| 6 | 190 | 240 | 6.1 | 43 | 10.4 | 23.0 | 81 | 3.75 |
| 7 | 180 | 240 | 5.3 | 44 | 2.7 | 20.1 | 86 | 3.78 |
| 8 | 180 | 240 | 11.1 | 20 | 5.5 | 44.9 | 93 | 4.05 |
| 9 | 190 | 240 | 58.1 | 8 | 5.5 | 82.5 | 97 | 1.42 |

[1]grams of feed per gram of dry wood per hour

As shown in Table 1, only 39% of the initial wood sample was digested for entry 4, where $T_2$ was limited to 220° C. For all other runs $T_2$ was set at 240° C., and more than 70% digestion was obtained. Digestion in excess of 90% was possible within 5.5 hours, despite pH buffering to ~5.4 via addition of KOH. The extent of digestion did not correlate strongly with solvent flowrate, but was instead primarily dependent upon time and temperature.

Example 3

Digestion Using a Sulfided Catalyst

A ½ inch×10-inch catalytic reactor was packed with 4.53 grams of sulfided Criterion DC2534 cobalt-molybdate catalyst containing 14% Mo and 3.5% cobalt on an alumina support. The catalyst was pre-sulfided under flowing $H_2S$ under conditions described in CRI publication 707/1107 *Sulfiding of Tail Gas Catalyst: Proper Preparation of Tail Gas Hydrogenation Catalyst for Long and Active Life*. After addition of 500 psig hydrogen, the reactor was heated to 255° C. for 6.5 hours. A solution of 50 wt. % sorbitol containing 1% acetic acid, buffered to pH 5.5 with 1N KOH, also containing 148 ppm cysteine and 1584 ppm alanine as amino acid poisons, was fed to the catalyst at temperatures from 240° C.-260° C. for more than 70 days, at a weight hour space velocity of 0.26. Conversion of sorbitol was sustained at greater than 50%, despite the continuous feed of the amino-acid containing solution.

An alternate study was conducted with 4.02 grams of a 1.9% Pt/zirconia catalyst doped with 3.75:1 rhenium/platinum under otherwise identical conditions. Virtually complete deactivation of the catalyst performance was observed within 24 hours, as indicated by HPLC analysis of unconverted sorbitol.

Example 4

Combined Digestion/Catalytic Reduction

A pilot scale flow digestion unit comprising a 1-inch outside diameter tube×37⅞ inches long, was packed with 64.0 grams of nominal ¼-inch softwood chips (moisture content of 34.3%). The digestion unit was filled upflow with a digestion solvent comprising 25 wt. % 2-propanol, 20 wt. % ethanol, 2 wt. % dimethylketone, and 1 wt. % acetic acid in deionized water. The temperature was set via electric heater to 190° C., and ramped to 250° C. over one hour, before reaching a final setpoint of 270° C. which was continued for total run time of 7.8 hours. Only 7 grams of wood remained after the digestion, indicating dissolution of 83% of the original wood feed (dry basis).

22.4 grams of the blended product were charged with 0.353 grams of sulfided cobalt-molybdate catalyst (Criterion DC2534), to a 75-ml Parr5000 Hastelloy multireactor, stirred by magnetic stir bar. The reactor was pressured to 72 bar with hydrogen and ramped from 170° C.-250° C. over 6 hours, before maintaining 250° C. overnight. A companion Parr5000 experiment was conducted in 20-grams of solvent and the same amount of sulfided cobalt molybdate catalyst, with direct addition of 2.3 grams of softwood chips to the reactor. Product formation (mono-oxygenates, glycols, diols, alkanes, acids) was monitored via a gas chromatographic (GC) method "DB5-ox" using a 60-mm×0.32 mm ID DB-5 column of 1 m thickness, with 50:1 split ratio, 2 ml/min helium flow, and column oven at 40° C. for 8 minutes, followed by ramp to 285° C. at 10° C./min, and a hold time of 53.5 minutes. The injector temperature was set at 250° C., and detector temperature was set at 300° C. Results indicated the conversion of more than 35% of the original wood to monooxygenates and other hydrocarbons of retention time less than sorbitol, relative to the product formation observed with direct wood addition to the reaction mixture.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a biomass conversion system comprising:
a first fluid circulation loop comprising:
a hydrothermal digestion unit; and
a first catalytic reduction reactor unit in fluid communication with an inlet and an outlet of the hydrothermal digestion unit;
wherein the first catalytic reduction reactor unit contains at least one first catalyst that is capable of activating molecular hydrogen; and
a second fluid circulation loop comprising:
a reaction product take-off line in fluid communication with the first fluid circulation loop;
a second catalytic reduction reactor unit in fluid communication with the reaction product take-off line;
wherein the second catalytic reduction reactor unit contains at least one second catalyst that is capable of activating molecular hydrogen; and
a recycle line establishing fluid communication between the first fluid circulation loop and an outlet of the second catalytic reduction reactor unit;
providing a cellulosic biomass in the hydrothermal digestion unit;
heating the cellulosic biomass in the hydrothermal digestion unit to digest at least a portion of the cellulosic biomass and form a hydrolysate comprising soluble carbohydrates within a liquor phase;
wherein at least about 70% of the heat added to the cellulosic biomass in the hydrothermal digestion unit is generated internally in the first catalytic reduction reactor unit and the second catalytic reduction reactor unit;
transferring at least a portion of the liquor phase to the first catalytic reduction reactor unit;
forming a first reaction product in the first catalytic reduction reactor unit;
recirculating at least a portion of the liquor phase to the hydrothermal digestion unit at a first flow rate; and
altering the first flow rate to increase or decrease a temperature of the liquor phase in the first fluid circulation loop.

2. The method of claim 1, wherein heating the cellulosic biomass in the hydrothermal digestion unit takes place at a pressure of at least about 30 bar.

3. The method of claim 1, wherein heating the cellulosic biomass in the hydrothermal digestion unit takes place in the presence of an organic solvent.

4. The method of claim 1, wherein the liquor phase is recirculated to the hydrothermal digestion unit such that countercurrent flow is established in the hydrothermal digestion unit.

5. The method of claim 1, wherein at least about 60% of the cellulosic biomass, on a dry basis, is digested to produce hydrolysate.

6. The method of claim 1, wherein at least about 90% of the cellulosic biomass, on a dry basis, is digested to produce hydrolysate.

7. The method of claim 1, wherein at least the at least one first catalyst comprises a poison-tolerant catalyst.

8. The method of claim 1, wherein at least the at least one first catalyst comprises a sulfided catalyst.

9. The method of claim 1, wherein the first flow rate is such that the liquor phase spends about 3 hours or less in the hydrothermal digestion unit before being transferred to the first catalytic reduction reactor unit.

10. The method of claim 1, wherein the first flow rate is such that the liquor phase is recirculated in the first fluid circulation loop at a recycle ratio of at least about 2.

11. The method of claim 1, wherein the first flow rate is such that the liquor phase is recirculated in the first fluid circulation loop at a recycle ratio of up to about 20.

12. The method of claim 1, wherein the first flow rate is such that the liquor phase is recirculated in the first fluid circulation loop at a recycle ratio ranging between about 4 and about 10.

13. The method of claim 1, wherein providing a cellulosic biomass in the hydrothermal digestion unit comprises continuously or semi-continuously adding a cellulosic biomass to the hydrothermal digestion unit without the hydrothermal digestion unit being depressurized.

14. The method of claim 13, wherein, after the cellulosic biomass is added to the hydrothermal digestion unit, the pressure in the hydrothermal digestion unit is at least about 30 bar.

15. The method of claim 1, wherein the liquor phase enters the first catalytic reduction reactor unit at a temperature ranging between about 120° C. and about 190° C. and exits the first catalytic reduction reactor unit at a temperature ranging between about 260° C. and about 275° C.

16. The method of claim 1, further comprising:
converting the first reaction product into a biofuel.

17. The method of claim 1, further comprising:
monitoring the temperature of the liquor phase in the first fluid circulation loop.

18. The method of claim 1, further comprising:
performing a phase separation of the first reaction product to form an aqueous phase and an organic phase; and
recirculating the aqueous phase to the hydrothermal digestion unit.

19. The method of claim 1, further comprising:
transferring at least a portion of the first reaction product to the second fluid circulation loop;
forming a second reaction product in the second catalytic reduction reactor unit; and
recirculating at least a portion of the second reaction product to the first fluid circulation loop at a second flow rate.

20. The method of claim 19, further comprising:
converting the second reaction product into a biofuel.

21. The method of claim 19, further comprising:
performing a phase separation of the second reaction product to form an aqueous phase and an organic phase.

22. The method of claim 21, further comprising:
recirculating at least a portion of the organic phase to the first fluid circulation loop.

23. The method of claim 19, wherein the second flow rate is such that the second reaction product is recirculated to the first fluid circulation loop at a recycle ratio of at least about 0.1.

24. The method of claim 19, wherein the second flow rate is such that the second reaction product is recirculated to the first fluid circulation loop at a recycle ratio ranging between about 0.1 and about 0.5.

25. The method of claim 19, wherein the second flow rate is such that a sufficient quantity of the second reaction product is recirculated to the first fluid circulation loop to inhibit lignins from precipitating.

26. The method of claim 19, wherein the second reaction product comprises a higher percentage of organic compounds than it does water.

* * * * *